US012380838B2

(12) United States Patent
Zhai et al.

(10) Patent No.: US 12,380,838 B2
(45) Date of Patent: Aug. 5, 2025

(54) DISPLAY PANEL AND DRIVING METHOD FOR THE SAME, AND DISPLAY DEVICE

(71) Applicant: Shanghai Tianma Micro-Electronics Co., Ltd., Shanghai (CN)

(72) Inventors: Yingteng Zhai, Shanghai (CN); Yuan Ding, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/607,586

(22) Filed: Mar. 18, 2024

(65) Prior Publication Data

US 2024/0249670 A1 Jul. 25, 2024

Related U.S. Application Data

(63) Continuation of application No. 17/656,231, filed on Mar. 24, 2022, now Pat. No. 11,955,058.

(30) Foreign Application Priority Data

Dec. 31, 2021 (CN) ........................ 202111671753.1

(51) Int. Cl.
*G09G 3/32* (2016.01)

(52) U.S. Cl.
CPC ....... *G09G 3/32* (2013.01); *G09G 2320/0233* (2013.01)

(58) Field of Classification Search
None
See application file for complete search history.

(56) References Cited

U.S. PATENT DOCUMENTS

2009/0109149 A1* 4/2009 Akimoto .............. G09G 3/3233 345/76
2020/0312229 A1* 10/2020 Kim ......................... G09G 3/32
2020/0365078 A1* 11/2020 Zhai ..................... G09G 3/3233
2021/0210002 A1* 7/2021 Kim ......................... G09G 3/32
2022/0101783 A1* 3/2022 Han ......................... G09G 3/32
2023/0121681 A1* 4/2023 Hwang ................ G09G 3/2014 345/55
2023/0124542 A1* 4/2023 Hwang .................... G09G 3/32 345/204

(Continued)

FOREIGN PATENT DOCUMENTS

CN 113287161 A 8/2021

*Primary Examiner* — Nitin Patel
*Assistant Examiner* — Amen W Bogale
(74) *Attorney, Agent, or Firm* — KILPATRICK TOWNSEND & STOCKTON LLP

(57) ABSTRACT

A display panel, a display device and a method for driving a display panel are provided. The display panel includes N types of display areas which includes an i-th type display area and a j-th type display area. The display panel includes M display parts which include a first display part and a second display part. The first display part includes at least one i-th type display area, and the second display part includes at least one i-th type display area. At least one j-th type display area is arranged between the i-th type display area included in the first display part and the i-th type display area included in the second display part. Light-emitting time periods of the i-th type display area and the j-th type display area at least partially do not overlap, to reduce the number of sub-pixels driven at the same time period.

20 Claims, 27 Drawing Sheets

(56) References Cited

U.S. PATENT DOCUMENTS

| | | | | |
|---|---|---|---|---|
| 2023/0142218 A1* | 5/2023 | Peng | G09G 3/2003 | 345/690 |
| 2023/0154372 A1* | 5/2023 | Hwang | G09G 3/2011 | 345/691 |
| 2023/0186836 A1* | 6/2023 | Jeong | G09G 3/32 | 345/55 |
| 2023/0206827 A1* | 6/2023 | Kim | G11C 19/28 | |
| 2024/0038170 A1* | 2/2024 | Zhai | G09G 3/3233 | |

* cited by examiner

DISPLAY PANEL AND DRIVING METHOD FOR THE SAME, AND DISPLAY DEVICE

CROSS REFERENCE OF RELATED APPLICATION

The present application is a continuation application of U.S. patent application Ser. No. 17/656,231, filed on Mar. 24, 2022, which claims priority to Chinese Patent Application No. 202111671753.1, titled "DISPLAY PANEL AND DRIVING METHOD FOR THE SAME, AND DISPLAY DEVICE", filed on Dec. 31, 2021 with the China National Intellectual Property Administration, which is incorporated herein by reference in its entirety.

FIELD

The present disclosure relates to the field of display technology, and in particular, to a display panel, a display device including the display panel and a method for driving the display panel.

BACKGROUND

With the development of display technology, display panels are commonly used and users have more and more requirements on display quality of the display panels. In order to meet the users' increasing requirements on the display quality of the display panels, the number of display units included in a display panel with a limited size is increasing, to increase the resolution of the display panels and improving the richness of display images of the display panels.

At present, pulse width modulation (PWM) driving circuits are widely used in the display panels to control duration of a driving current of a light-emitting element in a display unit, and to control a light-emitting state of the light-emitting element. However, as the number of the display units included in the display panel increases, a voltage drop on a power line in the display panel also increased, resulting in poor display uniformity of the display panel.

SUMMARY

In order to solve the above problems, a display panel, a display device including the display panel and a method for driving the display panel are provided according to embodiments of the present disclosure.

The following solutions are provided according to embodiments of the present disclosure.

A display panel is provided in the present disclosure. The display panel includes a pixel driving circuit and sub-pixels. The pixel driving circuit includes a pulse width modulation module. The pulse width modulation module is configured to receive at least a sweep signal, provide a pulse width setting signal and control a light emitting time of at least one of the sub-pixels. The display panel includes N types of display areas, and the N types of display areas include an h-th type display area and a k-th type display area, where N is an integer greater than or equal to two, each of h and k is an integer greater than zero and less than or equal to N. During a refresh cycle of the display panel, a start time of an effective time period of a sweep signal received by a pixel driving circuit in the h-th type display area is earlier than a start time of an effective time period of a sweep signal received by a pixel driving circuit in the k-th type display area.

A display device is provided in the present disclosure. The display device includes a pixel driving circuit and sub-pixels. The pixel driving circuit includes a pulse width modulation module. The pulse width modulation module is configured to receive at least a sweep signal, provide a pulse width setting signal and control a light emitting time of at least one of the sub-pixels. The display panel includes N types of display areas, and the N types of display areas include an h-th type display area and a k-th type display area, where N is an integer greater than or equal to two, each of h and k is an integer greater than zero and less than or equal to N. During a refresh cycle of the display panel, a start time of an effective time period of a sweep signal received by a pixel driving circuit in the h-th type display area is earlier than a start time of an effective time period of a sweep signal received by a pixel driving circuit in the k-th type display area.

BRIEF DESCRIPTION OF THE DRAWINGS

In order to more clearly describe the embodiments of the present disclosure, drawings to be used in the description of the embodiments of the present disclosure or the conventional technology are briefly described hereinafter. It is apparent that the drawings described below are merely used for describing the embodiments of the present disclosure, and additional drawings other than the provided drawings may be provided.

DETAILED DESCRIPTION OF EMBODIMENTS

Embodiments of the present disclosure are described below in conjunction with the drawings of the embodiments of the present disclosure. Apparently, the embodiments described below are only some embodiments of the present disclosure, rather than all the embodiments.

Many details are set forth in the following description to facilitate a full understanding of the present disclosure. However, the present disclosure may be implemented in other manners different from those described herein. Therefore, the present disclosure is not limited by the embodiments disclosed below.

As described in the background, with the increase of the number of display units included in the display panel, the voltage drop on the power line in the display panel is increased, resulting in poor display uniformity of the display panel.

In the display panel, the driving current of the light-emitting element is controlled by the pulse width modulation (PWM) circuit, and the light-emitting element is driven by the current. During a light-emitting time period, light-emitting elements emit lights simultaneously, and in order to make the light-emitting elements emit lights with the same brightness during the light-emitting time period, a significant increase of an instantaneous current on the power supply voltage line is caused, resulting in a large voltage drop on the power supply voltage line, to affect the uniformity of the display screen.

In addition, in a case of a large number of light-emitting elements driven by one power supply voltage line, in order to make the light-emitting elements emit lights with the same brightness during the light-emitting time period, the increase of the instantaneous current on the power supply voltage line is large and the voltage drop on the power supply voltage line is large, resulting in worse uniformity of the display screen.

Figure 1:
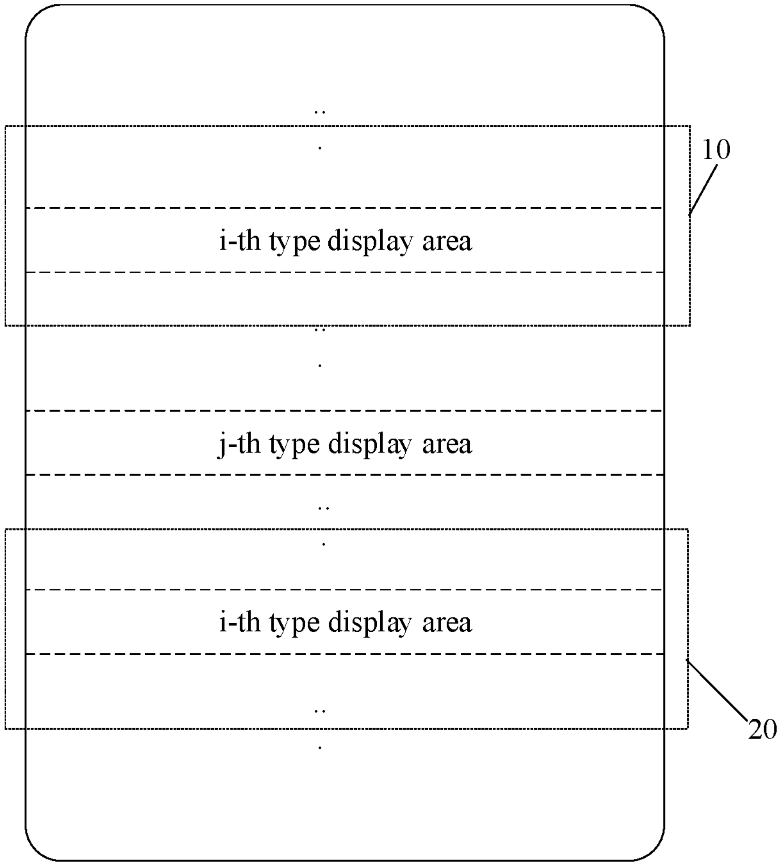
FIG. 1 is a schematic diagram of a display panel according to an embodiment of the present disclosure.
Figure 2:
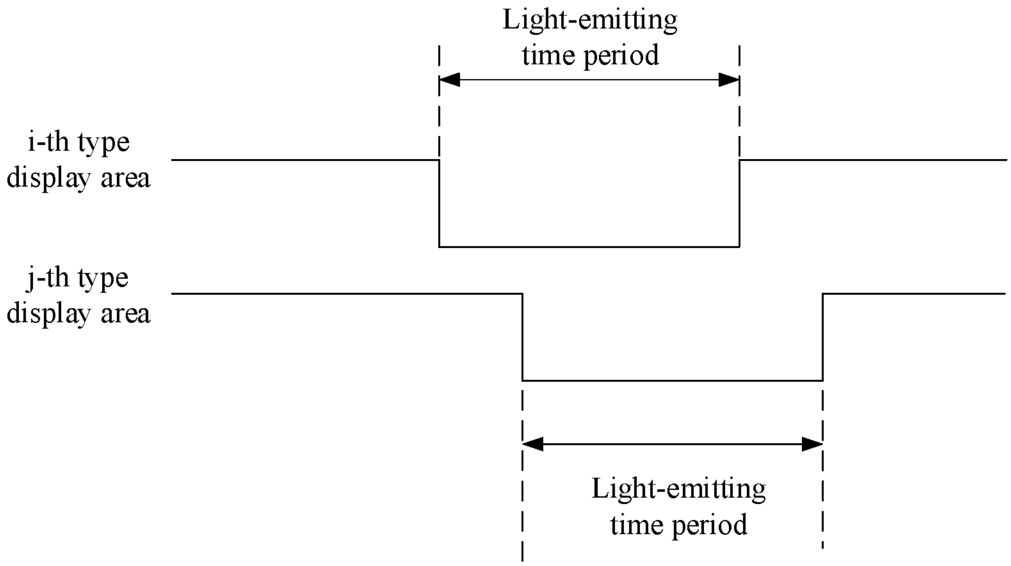
FIG. 2 is a schematic diagram showing that a light-emitting time period of an i-th type display area and a light-emitting time period of a j-th type display area at least partially do not overlap in a display panel according to an embodiment of the present disclosure.

In view of the above, a display panel is provided according to an embodiment of the present disclosure. As shown in FIG. 1, the display panel includes N types of display areas. The N types of display areas include an i-th type display area and a j-th type display area. As shown in FIG. 2, light-emitting time periods of the i-th type display area and the j-th type display area at least partially do not overlap, to reduce the number of sub-pixels driven by a power supply voltage line in the display panel at the same time period, and to reduce a rise amplitude of an instantaneous current on the power supply voltage line and reduce a driving current transmitted on the power supply voltage line when the sub-pixels emitting lights at the same time period emit lights with the same brightness, to reduce a voltage drop on the power supply voltage line and improving the uniformity of a display screen. N is an integer greater than or equal to two. i is greater than zero, and less than or equal to N. j is greater than zero, and less than or equal to N. i and j are integers and i is not equal to j.

In an embodiment, light-emitting time periods of any two types of display areas in the N types of display areas at least partially do not overlap, and to further reduce the number of sub-pixels driven by the power supply voltage line in the display panel in the same time period, and when the sub-pixels emitting lights at the same time period emit lights with the same brightness, a rise amplitude of an instantaneous current on the power supply voltage line and a driving current transmitted on the power supply voltage line are reduced, to reduce a voltage drop on the power supply voltage line and improving the uniformity of a display screen, which is not limited in the present disclosure and depends on actual situations.

It should be noted that in the embodiments of the present disclosure, display areas of the display panel are divided into N types of display areas according to light-emitting time period. Sub-pixels arranged in the same type of display area have the same light-emitting time period, that is, the sub-pixels arranged in the same type of display area have the same starting light-emitting time and the same ending light-emitting time. It should be noted that in this embodiment, the display panel at least includes two i-th type display areas, and the display panel may include one or more j-th display areas, which is not limited in the present disclosure and depends on actual situations.

Figure 3:
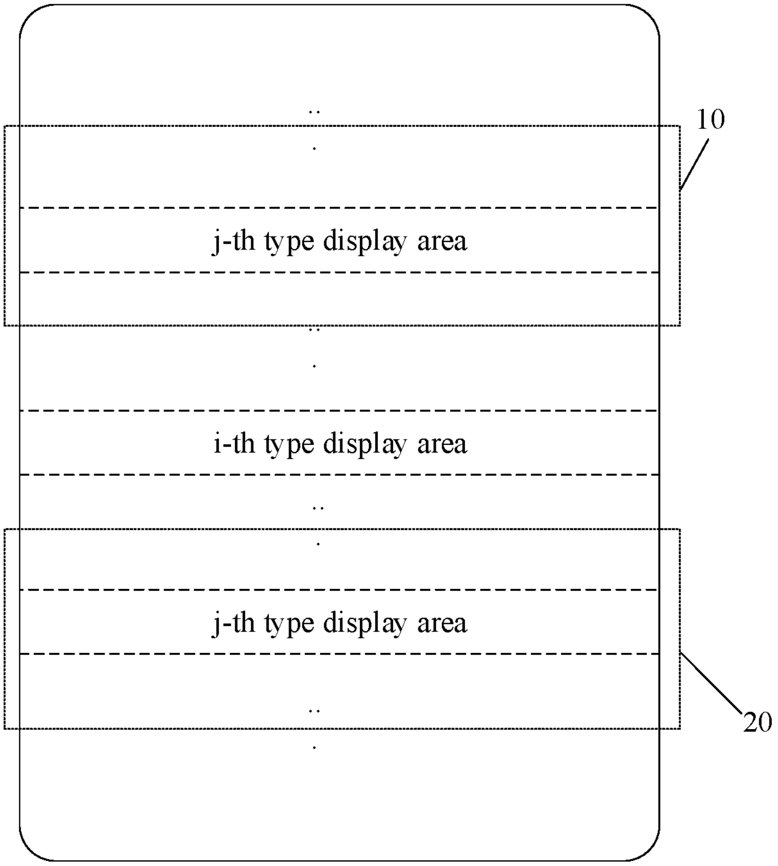
FIG. 3 is a schematic diagram of a display panel according to another embodiment of the present disclosure.

In the embodiments of the present disclosure, the display panel includes M display parts. M is an integer greater than or equal to two. As shown in FIG. 1, the M display parts include a first display part 10 and a second display part 20. The first display part 10 includes at least one i-th type display area, and the second display part 20 includes at least one i-th type display area. At least one j-th type display area is arranged between the i-th type display area included in the first display part 10 and the i-th type display area included in the second display part 20, that is, in the embodiments of the present disclosure, at least one j-th type display area is arranged between i-th type display areas in different display parts. Similarly, as shown in FIG. 3, in a case that the first display part 10 further includes a j-th type display area and the second display part 20 further includes a j-th type display area, at least one i-th type display area is arranged between the j-th type display area included in the first display part 10 and the j-th type display area included in the second display part 20, that is, in the embodiments of the present disclosure, at least one i-th type display area is arranged between j-th type display areas in different display parts.

It should be noted that in the embodiments of the present disclosure, multiple i-th type display areas are at least distributed in the first display part and the second display part, and at least one j-th type display area is arranged between the i-th type display area included in the first display part and the i-th type display area included in the second display part, which causes that when the i-th type display areas emit lights, the display areas emitting lights are at least distributed in two display parts rather than distributed in one display part, further improving the uniformity of the display screen.

Similarly, in a case that the N types of display areas include multiple j-th type display areas, the multiple j-th type display areas are at least distributed in the first display part and the second display part, and at least one i-th type display area is arranged between the j-th type display area included in the first display part and the j-th type display area included in the second display part, which causes that when the j-th type display areas emit lights, the display areas emitting lights are at least distributed in two display parts rather than distributed in one display part, further improving the uniformity of the display screen.

It should be noted that in this embodiment, the first display part may include N types of display areas or a part of types among the N types of display areas, and the second display part may include N types of display areas or a part of types among the N types of display areas, which is not limited in the present disclosure and depends on actual situations.

It should further be noted that the first display part may include one or more the same type of display areas. Similarly, the second display part may include one or more the same type of display areas. In addition, in a case that a display part includes multiple same type of display areas, the multiple same type of display areas in the display part may be arranged adjacent or not adjacent, which is not limited in the present disclosure and depends on actual situations.

The display panel according to the embodiment of the present disclosure is described below by taking a case that the first display part includes N types of display areas, the second display part includes N types of display areas, and the same type of display areas included in the same display part are arranged adjacent as an example.

In an embodiment of the present disclosure, the i-th type display areas are evenly distributed in the display panel and the j-th type display areas are evenly distributed in the display panel to further improve the uniformity of the display screen, which is not limited in the present disclosure and depends on actual situations.

In an embodiment of the present disclosure, as shown in FIG. 2, a start time of the light-emitting time period of the i-th type display area and a start time of the light-emitting time period of the j-th type display area do not overlap, and the light-emitting time period of the i-th type display area and the light-emitting time period of the j-th type display area do not overlap at least in part, and to reduce the rise amplitude of the instantaneous current on the power supply voltage line and the voltage drop on the power supply voltage line when the sub-pixels emitting lights at the same time period emit lights with the same brightness, improving the uniformity of the display screen.

Figure 4:
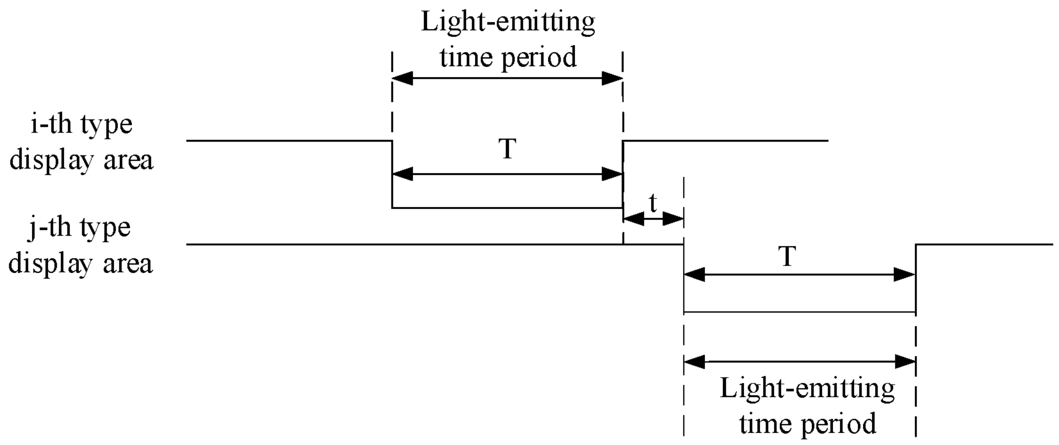
FIG. 4 is a schematic diagram showing that a light-emitting time period of an i-th type display area and a light-emitting time period of a j-th type display area do not overlap in a display panel according to an embodiment of the present disclosure.

In an embodiment of the present disclosure, as shown in FIG. 4, light-emitting time periods of the i-th type display area and the j-th type display area do not overlap to further reduce the number of sub-pixels driven by the power supply voltage line in the display panel at the same time period, and to reduce the rise amplitude of the instantaneous current on the power supply voltage line and the voltage drop on the power supply voltage line when the sub-pixels emitting lights at the same time period emit lights with the same brightness, improving the uniformity of the display screen.

In an embodiment of the present disclosure, in a case that N is an integer greater than 2, light-emitting time periods of different types of display areas among the N types of display areas do not overlap, and to reduce the rise amplitude of the instantaneous current on the power supply voltage line and the voltage drop on the power supply voltage line when the sub-pixels emitting lights at the same time period emit lights with the same brightness, improving the uniformity of the display screen, which is not limited in the present disclosure as long as light-emitting time periods of at least two types of display areas among the N types of display areas do not overlap.

Figure 5:
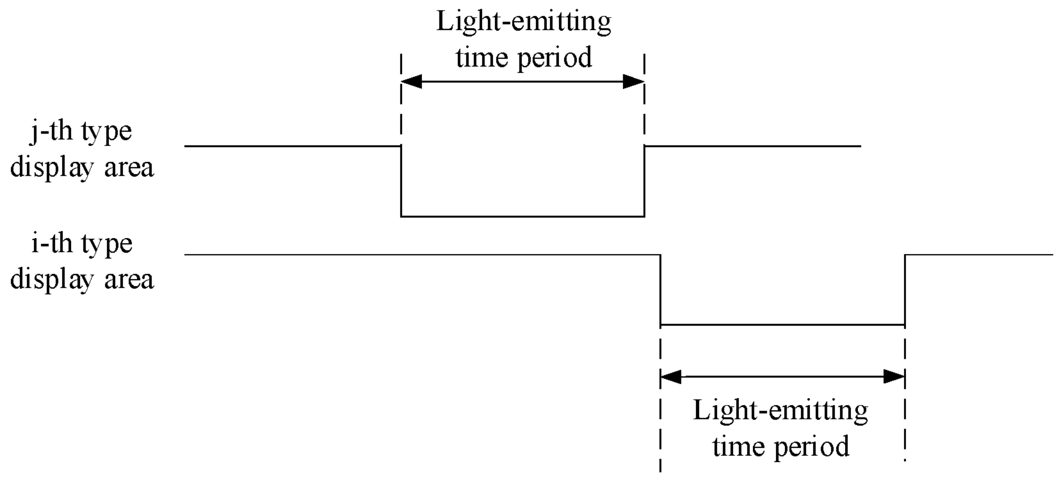
FIG. 5 is a schematic diagram showing that a light-emitting time period of an i-th type display area and a light-emitting time period of a j-th type display area do not overlap in a display panel according to another embodiment of the present disclosure.

In an embodiment of the present disclosure, in a display frame (that is, in a process of displaying a frame of display screen), as shown in FIG. 4, the i-th type display area emits a light first, and the j-th type display area emits a light later. A start time of the light-emitting time period of the i-th type display area is not earlier than an end time of the light-emitting time period of the j-th type display area, and the light-emitting time periods of the i-th type display area and the j-th type display area do not overlap at all. In another embodiment of the present disclosure, in a display frame, as shown in FIG. 5, the j-th type display area emits a light first, and the i-th type display area emits a light later. The start time of the light-emitting time period of the i-th type display area is not earlier than the end time of the light-emitting time period of the j-th type display area, and the light-emitting time periods of i-th type display area and the j-th type display area do not overlap at all, which is not limited in the present disclosure and depends on actual situations.

In an embodiment of the present disclosure, in a case that the light-emitting time periods of the i-th type display area and the j-th type display area do not overlap at all, an interval t between light-emitting time periods of two types of display areas with adjacent light-emitting time periods is greater than or equal to 1 microsecond and less than or equal to T/2. As shown in FIG. 4, the light-emitting time periods of the i-th type display area and the j-th type display area are adjacent. An interval between the light-emitting time period of the i-th type display area and the light-emitting time period of the j-th type display area is t, that is, an interval between an end time of the light-emitting time period of the i-th type display area and a start time of the light-emitting time period of the j-th type display area is t. T represents duration of a light-emitting time period. In a display frame, light-emitting time periods of the two types of display areas that emit lights successively do not overlap, and to reduce the voltage drop on the power supply voltage line, improving the uniformity of the display screen. In addition, it is required to avoid that the interval between the light-emitting time periods of the two types of display areas that emit lights successively is too large, which results in flickering of the display screen and affects user experience.

It should be noted that the light-emitting time periods of the two types of display areas having adjacent light-emitting time periods at least partially do not overlap, which means that there is no light-emitting time period of other type of display area between a start time of the light-emitting time period of a type of display area emitting a light first among the two types of display areas and a start time of the light-emitting time period of a type of display area emitting a light later among the two types of display areas. The light-emitting time periods of the two types of display areas having adjacent light-emitting time periods do not overlap at all, which means that there is no light-emitting time period of other type of display area between an end time of the light-emitting time period of the type of display area emitting a light first among the two types of display areas and the start time of the light-emitting time period of the type of display area emitting a light later among the two types of display areas.

Figure 6:
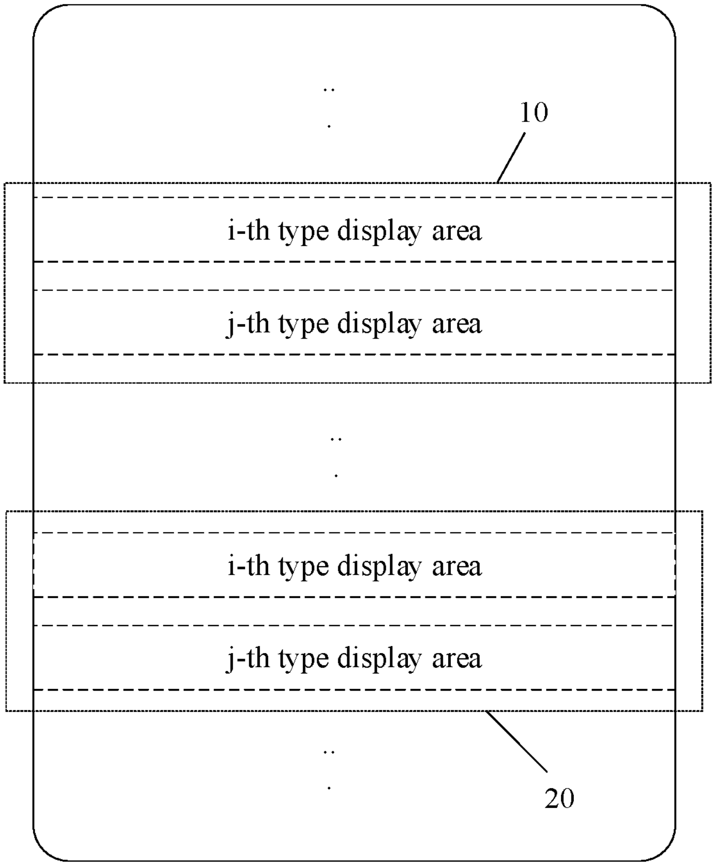
FIG. 6 is a schematic diagram of a display panel according to another embodiment of the present disclosure.

In an embodiment of the present disclosure, the first display part and the second display part include the same type of display areas among the N types of display areas and include the same number of the same type of display areas. That is, in a case that the first display part includes R types of display areas, the second display part also includes R types of display areas, where R is any integer not less than 1 and not greater than N. In a case that the first display part includes S display areas, the second display part also includes S display areas. As shown in FIG. 6, taking a case in which N is equal to two as an example, in a case that the first display part includes two types of display areas which are the i-th type display area and the j-th type display area, the second display part also includes two types of display areas which are the i-th type display area and the j-th type display area. In a case that the first display part includes one i-th type display area and one j-th type display area, the second display part further includes one i-th type display area and one j-th type display area, which is not limited in the present disclosure and depends on actual situations.

The display panel according to the embodiments of the present disclosure is described by taking a case in which the first display part includes N types of display areas and the second display part includes N types of display areas.

Figure 7:
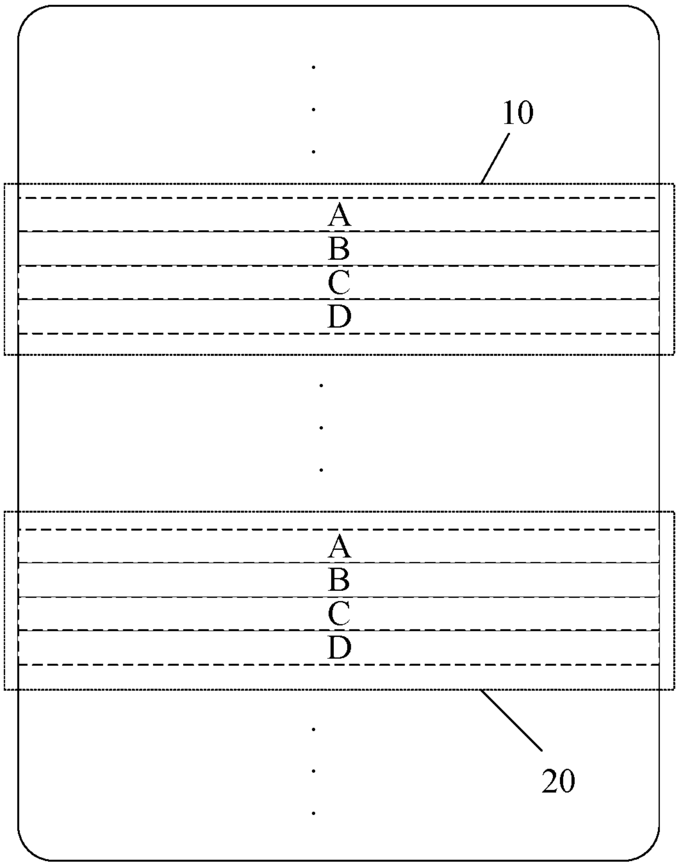
FIG. 7 is a schematic diagram of a display panel according to another embodiment of the present disclosure.

In an embodiment of the present disclosure, an arrangement order of various types of display areas in the first display part is the same as that in the second display part in a column direction. As shown in FIG. 7, taking a case in which N is equal to 4 as an example, the first display part 10 includes four types of display areas which are a first type display area A, a second type display area B, a third type display area C and a fourth type display area D. The first type display area A, the second type display area B, the third type display area C and the fourth type display area D are arranged in the first display part in the listed order. In addition, the second display part 20 includes four types of display areas which are the first type display area A, the second type display area B, the third type display area C and the fourth type display area D. The first type display area A, the second type display area B, the third type display area C and the fourth type display area D are arranged in the second display part in the listed order.

Figure 8:
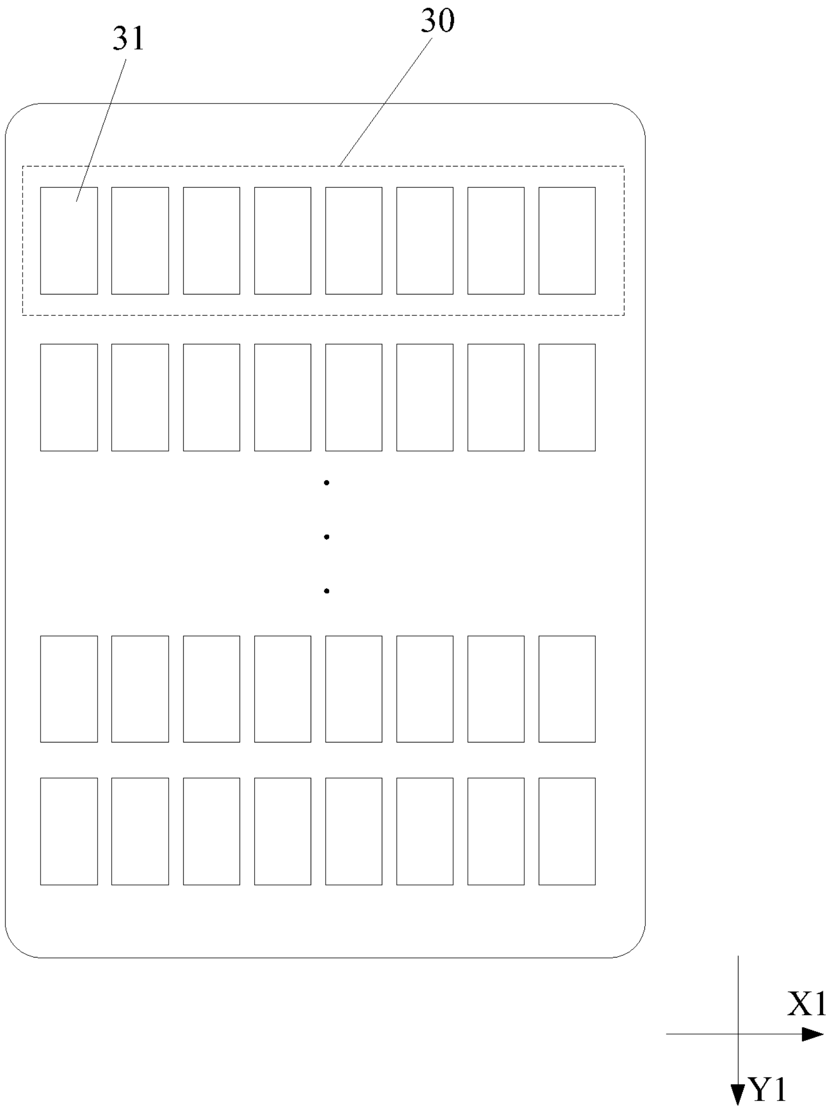
FIG. 8 is a schematic diagram of a display panel according to another embodiment of the present disclosure.

As shown in FIG. 8, in an embodiment of the present disclosure, the display panel includes multiple pixel rows 30 arranged along a column direction Y1. Sub-pixels 31 in each pixel row 30 are arranged along a row direction X1. The row direction X1 intersects the column direction Y1. In an embodiment, the row direction X1 is perpendicular to the column direction Y1, which is not limited in the present disclosure and depends on actual situations.

The display panel according to the embodiments of the present disclosure is described below by taking a case in which the row direction is perpendicular to the column direction as an example.

Figure 9:
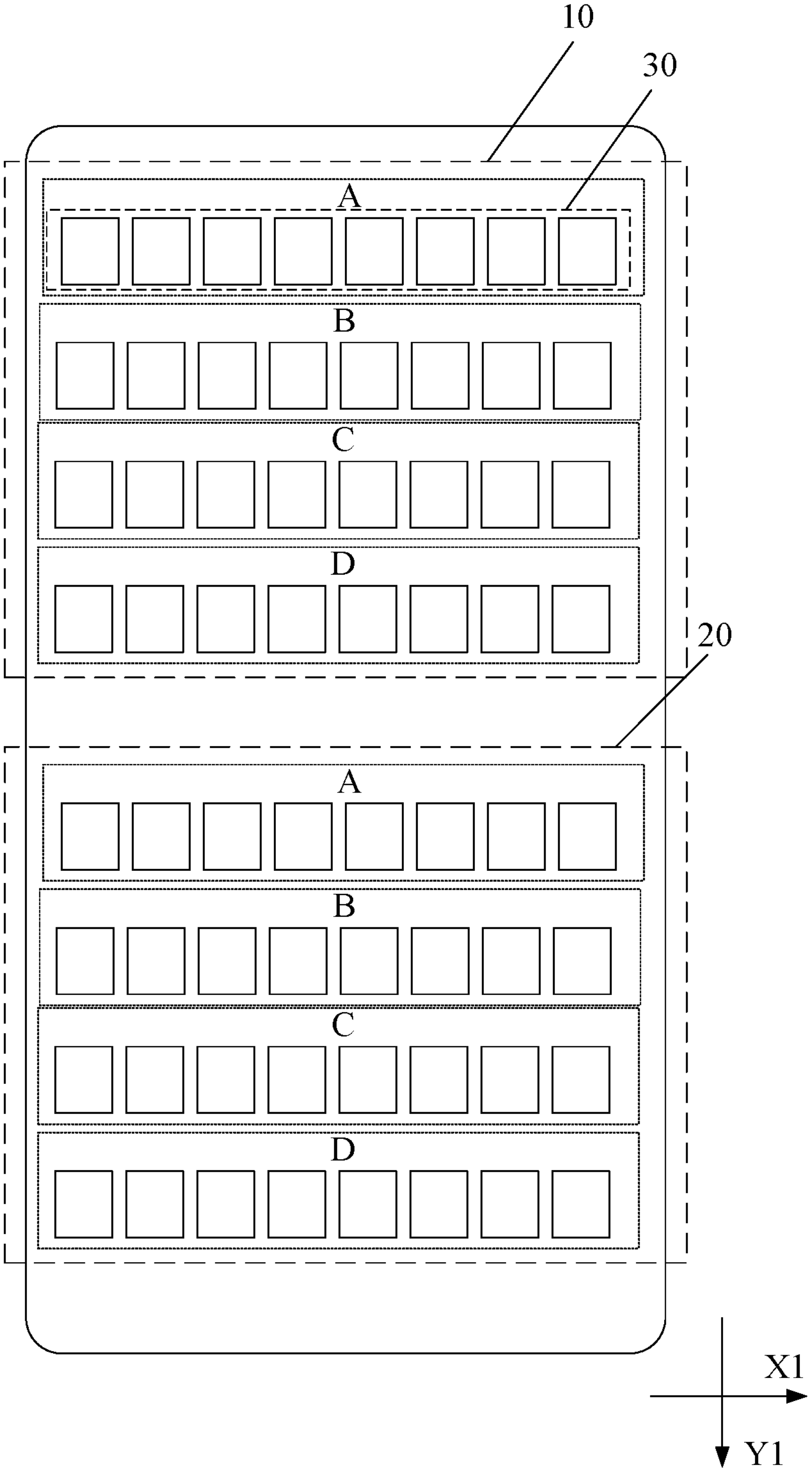
FIG. 9 is a schematic diagram of a display panel according to another embodiment of the present disclosure.

In an embodiment of the present disclosure, among the N types of display areas, each type of the N types of display areas includes one pixel row 30 to further improve the uniformity of the display screen of the display panel. Taking a case in which N is equal to 4 as an example, as shown in FIG. 9, the first display part includes four types of display areas, which are the first type display area A, the second type display area B, the third type display area C and the fourth type display area D. Each of the four types of display areas includes one pixel row 30.

Figure 10:
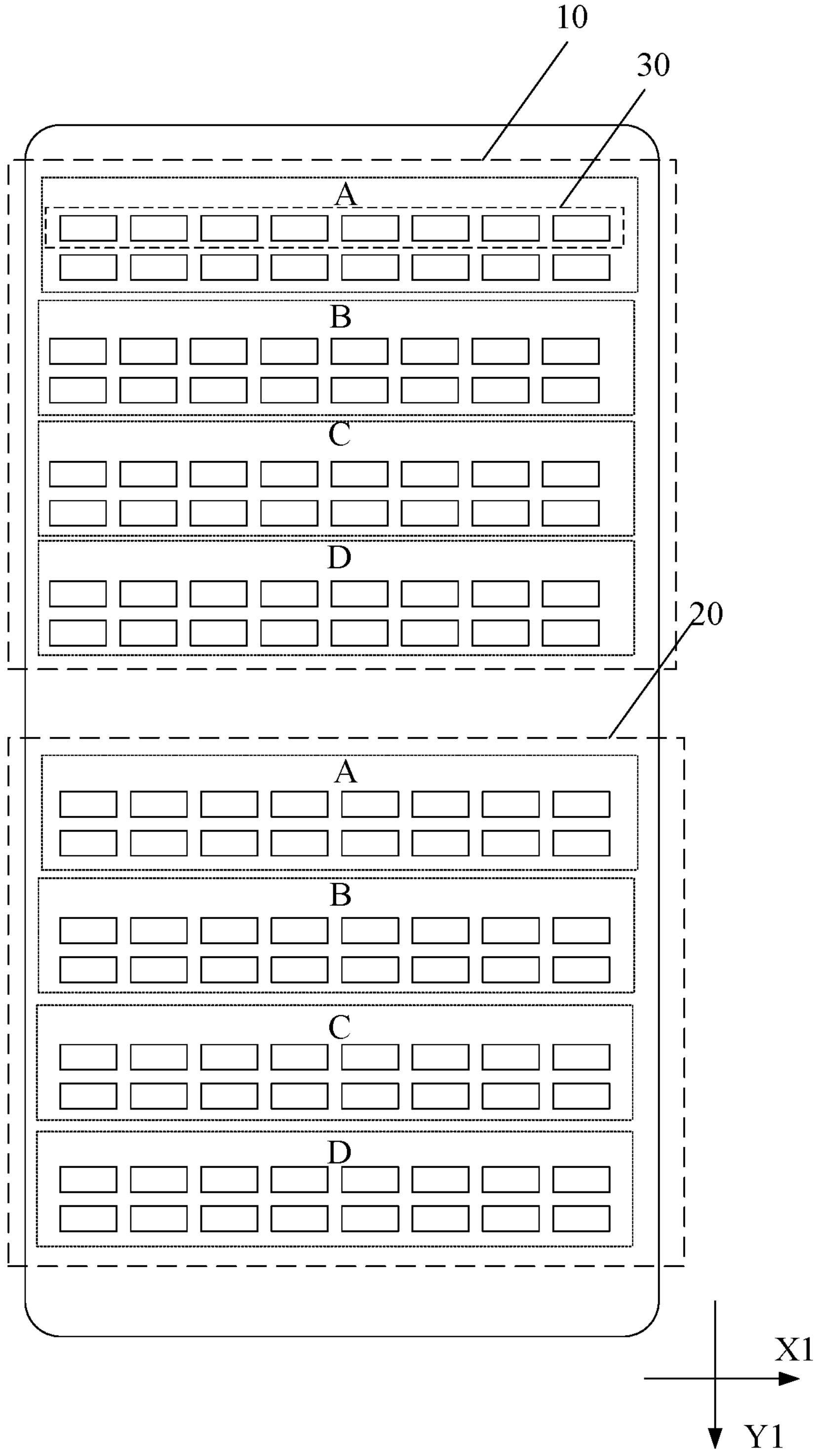
FIG. 10 is a schematic diagram of a display panel according to another embodiment of the present disclosure.

In another embodiment of the present disclosure, among the N types of display areas, each type display area includes at least two pixel rows to reduce the number of grid driving lines of pixel rows in the display panel and facilitate the layout of signal lines in the display panel. Taking a case in which N is equal to 4 as an example, in this embodiment, each of the four types of display areas may include two pixel rows, as shown in FIG. 10. In one embodiment, each of the four types of display areas may include three or more pixel rows, which is not limited in the present disclosure and depends on actual situations.

Figure 11:
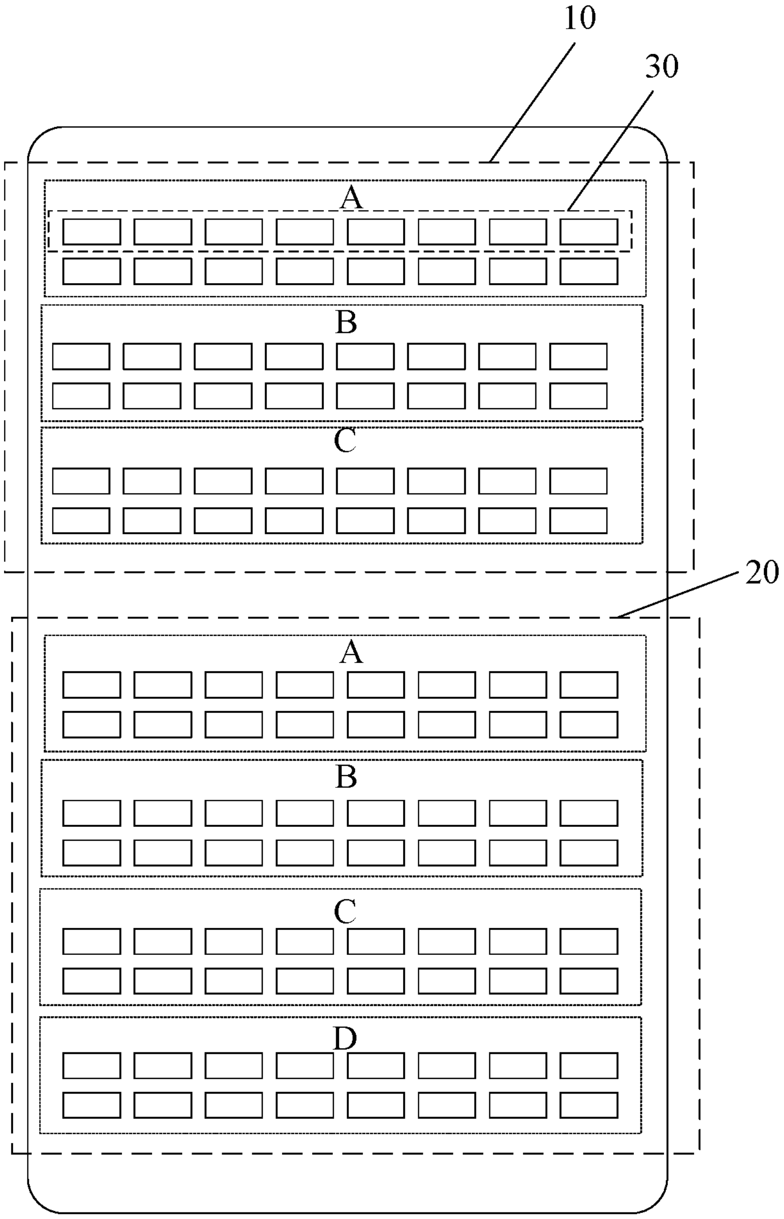
FIG. 11 is a schematic diagram of a display panel according to another embodiment of the present disclosure.

In an embodiment of the present disclosure, each of the M display parts includes the N types of display areas. Taking a case in which M is equal to two and N is equal to 4 as an example, as shown in FIG. 10, each of the first display part 10 and the second display part 20 includes the first type display area A, the second type display area B, the third type display area C and the fourth type display area D, which is not limited in the present disclosure. In other embodiments of the present disclosure, types and numbers of display areas included in different display parts may be different. Taking the case in which M is equal to two and N is equal to 4 as an example, as shown in FIG. 11, the M display parts include the first display unit 10 and the second display unit 20. The first display part 10 includes three types of display areas which are the first type display area A, the second type display area B, and the third type display area C. The second display part 20 includes four types of display areas which are the first type display area A, the second type display area B, the third type display area C and the fourth type display area D, which depends on actual situations.

Figure 12:
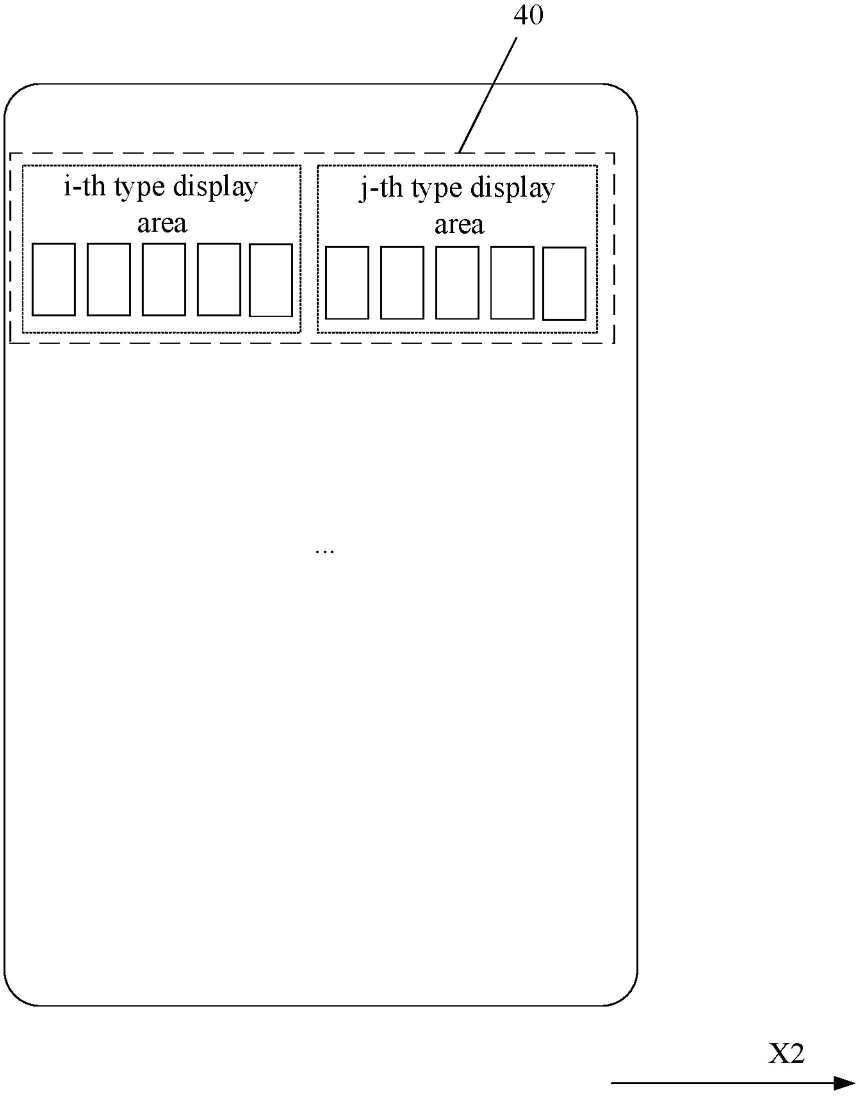
FIG. 12 is a schematic diagram of a display panel according to another embodiment of the present disclosure.

As shown in FIG. 12, in an embodiment of the present disclosure, the display panel includes a third display part 40, and the third display part 40 includes at least one i-th type display area and at least one j-th type display area. The i-th type display area and the j-th type display area are arranged in the third display part 40 along a first direction X2. The first direction X2 is an extension direction of a scanning line in the display panel, that is, in the embodiment of the present disclosure, among the multiple sub-pixels arranged along the extension direction of the scanning line, some sub-pixels are arranged in the i-th type display area and other sub-pixels are arranged in the j-th type display area, to reduce the number of sub-pixels driven by the scanning line in the same time period, to reduce the load on the scanning line. In an embodiment, the first direction X2 is the same as the row direction X1, which is not limited in the present disclosure and depends on actual situations.

It should be noted that in any one of the above embodiments, the sub pixel in the N types of display areas may be driven by the same grid driving circuit or different grid driving circuits, which is not limited in the present disclosure and depends on actual situations.

Figure 13:
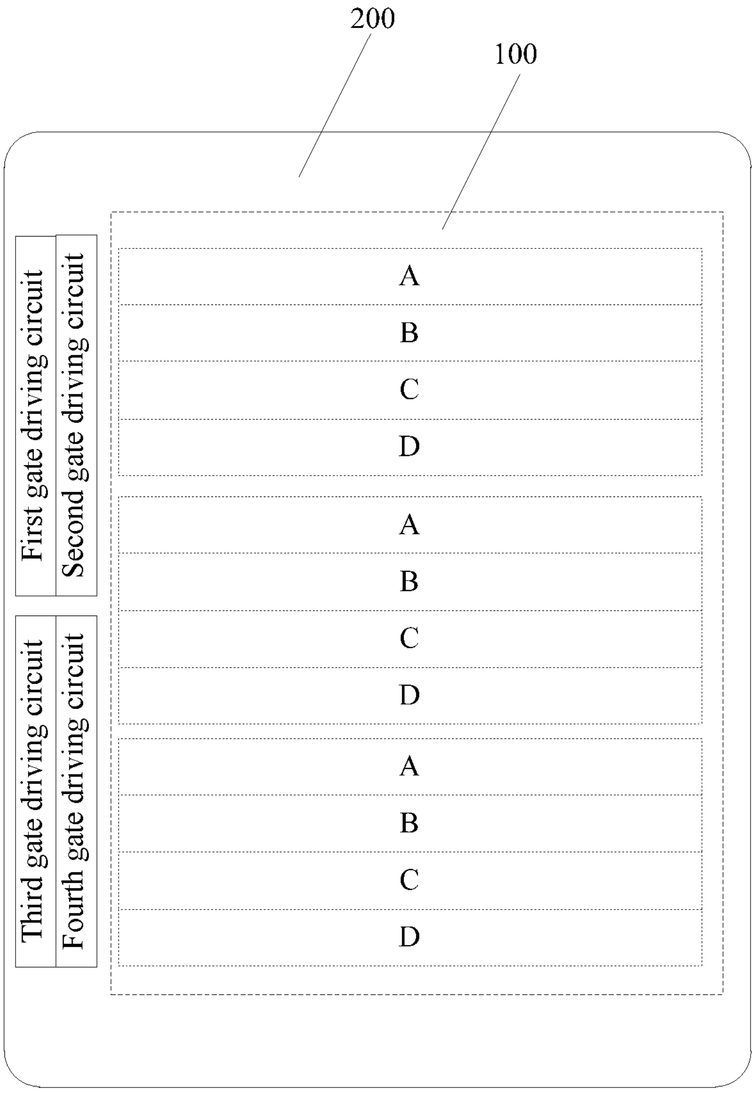
FIG. 13 is a schematic diagram of a display panel according to another embodiment of the present disclosure.

In an embodiment of the present disclosure, different types of display areas among the N types of display areas are driven by different grid driving circuits. In this embodiment, the display panel includes a grid driving module, and the grid driving module includes N grid driving circuits. The N grid driving circuits respectively correspond to the N types of display areas. Each of the N grid driving circuits provides a scanning driving signal to the sub-pixels in a display area corresponding to the grid driving circuit, and a driving mode of the gate driving circuit compatible with a driving mode of the conventional gate driving circuit, to reduce a cost of the display panel. As shown in FIG. 13, taking a case in which N is equal to 4 as an example, the N types of display areas include the first type display area A, the second type display area B, the third type display area C and the fourth type display area D. Accordingly, the gate driving module includes four gate driving circuits, which are a first gate driving circuit, a second gate driving circuit, a third gate driving circuit and a fourth gate driving circuit. The first grid driving circuit provides a grid driving signal to the first type display area A. The second grid driving circuit provides a grid driving signal to the second type display area B. The third grid driving circuit provides a grid driving signal to the third type display area C. The fourth grid driving circuit provides a grid driving signal to the fourth type display area D. The N types of display areas are located in a display area 100 of the display panel, and the grid driving module is located in a non-display area 200 of the display panel.

Figure 14:
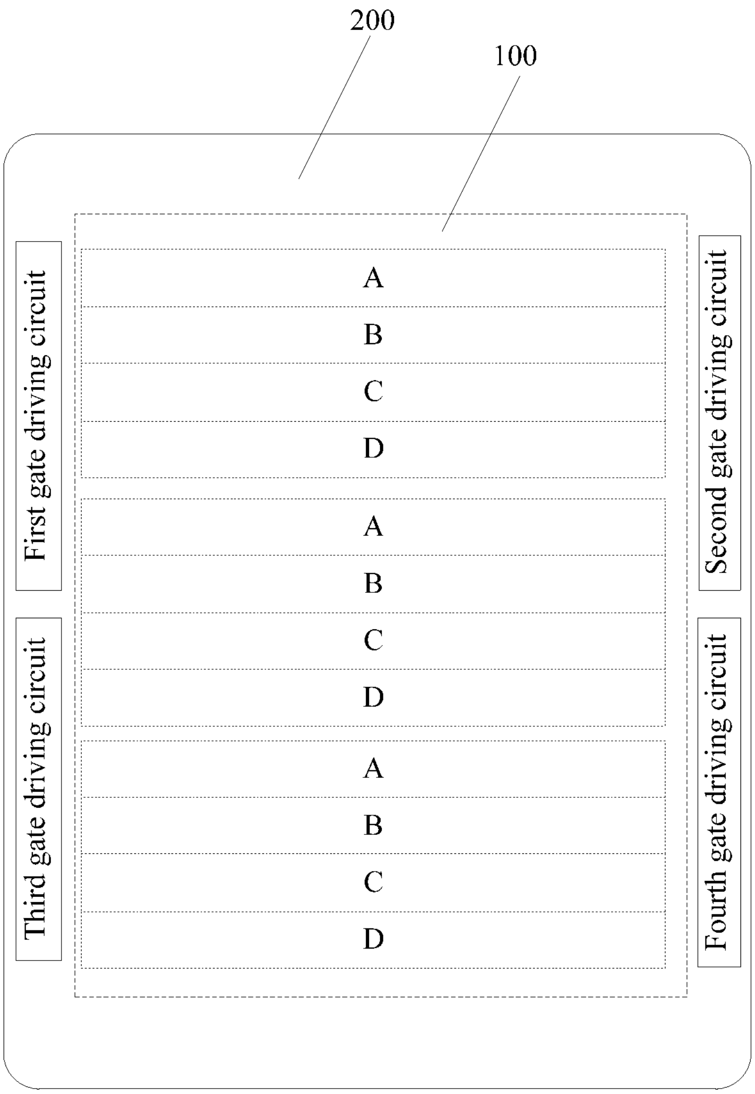
FIG. 14 is a schematic diagram of a display panel according to another embodiment of the present disclosure.

It should be noted that although the N gate driving circuits are arranged at the same side of the display area 100 in the display panel shown in FIG. 13, the present disclosure is not limited to this case. In other embodiments of the present disclosure, the N gate driving circuits may also be arranged at different sides of the display area 100, as shown in FIG. 14, which depends on actual situations.

In an embodiment of the present disclosure, the M display parts are arranged along a preset direction. In the preset direction, the gate driving module provides scanning driving signals to the sub-pixels of various types of display areas among the N types of display areas according to a first order. In this embodiment of the present disclosure, in a case that the N types of display areas include four types of display areas which are the first type display area A, the second type display area B, the third type display area C and the fourth type display area D, the first order may be A-B-C-D, B-A-C-D, C-A-B-D or other orders, which is not limited in the present disclosure and depends on actual situations.

In an embodiment of the present disclosure, in a display part, sub-pixels of various types of display areas are arranged in the preset direction according to the second order, and the first order is the same as the second order.

In an embodiment of the present disclosure, the preset direction includes a column direction. Taking a case in which the N types of display areas include the first type display area A, the second type display area B, the third type display area C and the fourth type display area D as an example, in this embodiment, the first type display area A, the second type display area B, the third type display area C and the fourth type display area D in an display part are driven according to the listed order. As shown in FIG. 10, the first type the display area A, the second type display area B, the third type display area C and the fourth type display area D included in the display part are arranged in the column direction Y1 according to the listed order.

Figure 15:
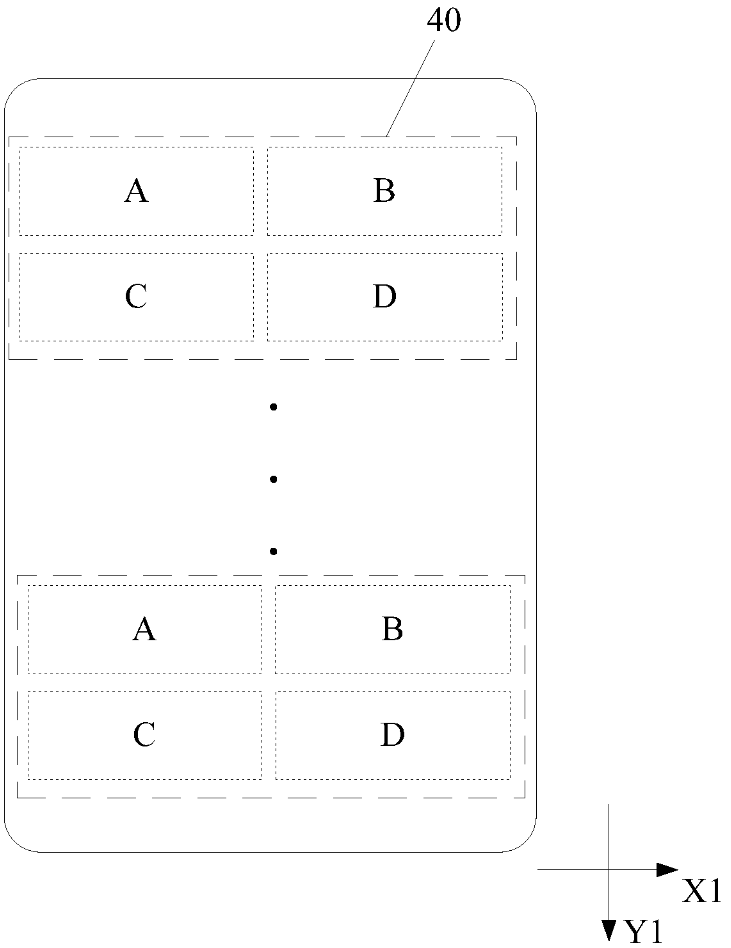
FIG. 15 is a schematic diagram of a display panel according to another embodiment of the present disclosure.
Figure 16:
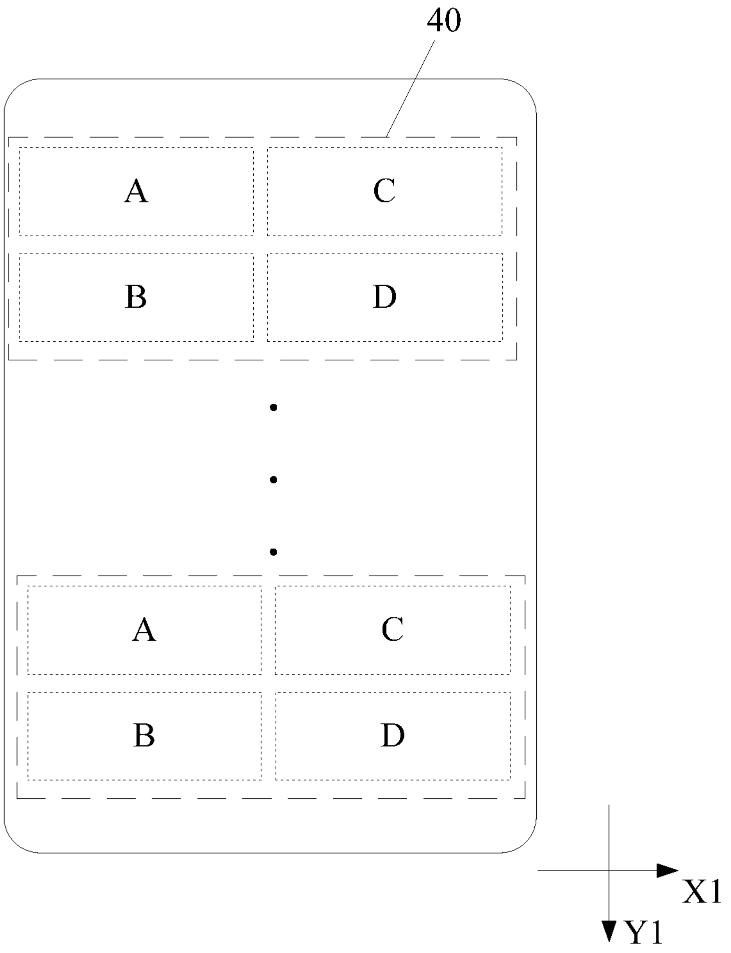
FIG. 16 is a schematic diagram of a display panel according to another embodiment of the present disclosure.

In another embodiment of the present disclosure, the preset direction includes a row direction and a column direction. Taking a case in which the N types of display areas include the first type display area A, the second type display area B, the third type display area C and the fourth type display area D as an example, in this embodiment, the first type display area A, the second type display area B, the third type display area C and the fourth type display area D in a display part are driven according to the listed order. In an implementation of this embodiment, as shown in FIG. 15, in the row direction X1, the display part includes the first type display area A and the second type display area B that are arranged sequentially, and the third type display area C and the fourth type display area D that are arranged sequentially. In the column direction Y1, the display part includes the first type display area A and the third type display area C that are arranged sequentially, and the second type display area B and the fourth type display area D that are arranged sequentially. In another implementation of this embodiment, as shown in FIG. 16, in the row direction X1, the display part includes the first type display area A and the third type display area C that are arranged sequentially, and the second type display area B and the fourth type display area D that are arranged sequentially. In the column direction Y1, the display part includes the first type display area A and the second type display area B that are arranged sequentially, and the third type display area C and the fourth type display area D that are arranged sequentially. In other implementations of this embodiment, the first type display area A, the second type display area B, the third type display area C and the fourth type display area D in a display part may be arranged in other arrangement order, which is not limited in the present disclosure and depends on actual situations.

In another embodiment of the present disclosure, in a display part, sub-pixels of various types of display areas are arranged in the preset direction according to a second order. The first order and the second order are different.

Figure 17:
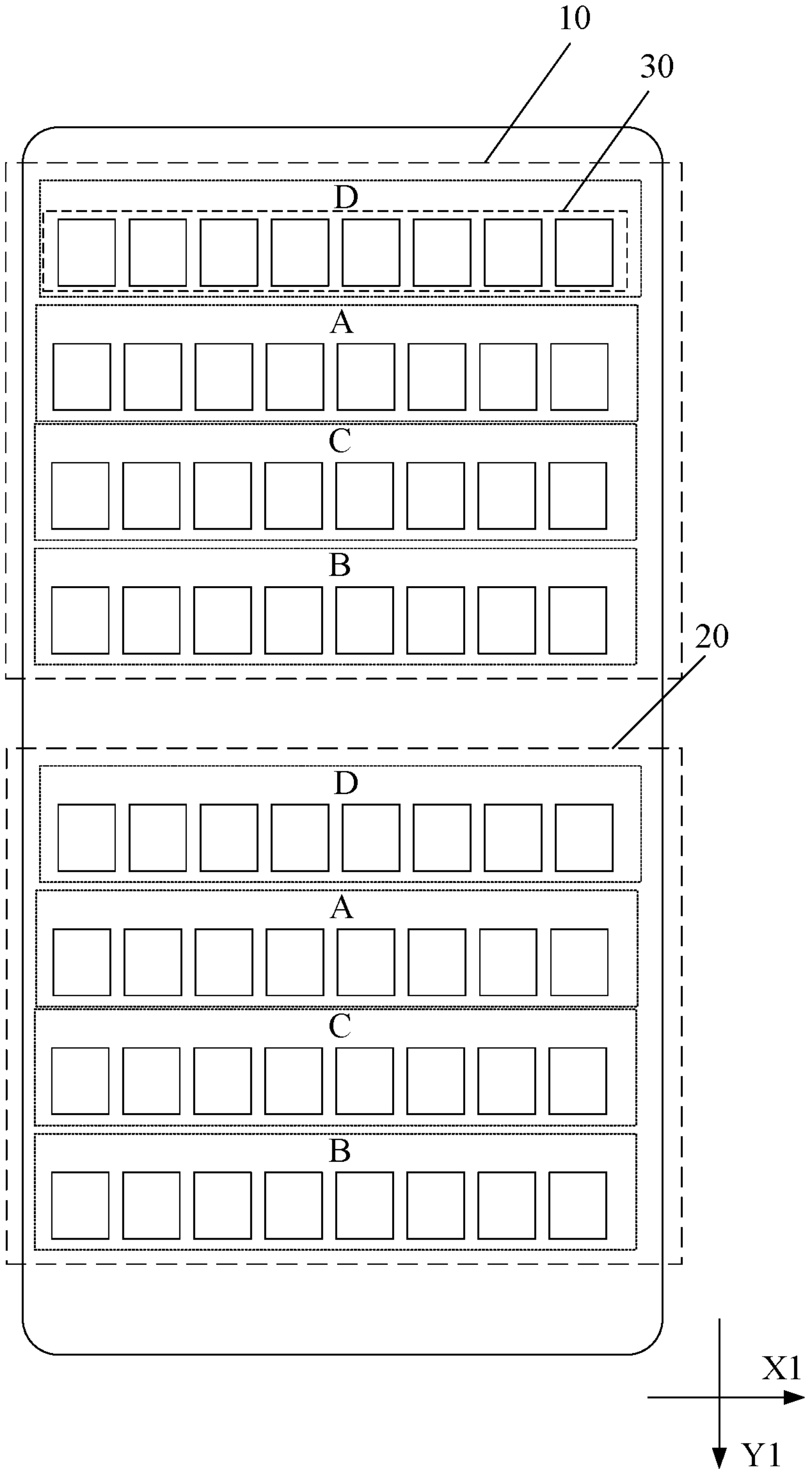
FIG. 17 is a schematic diagram of a display panel according to another embodiment of the present disclosure.

In an embodiment of the present disclosure, the preset direction includes a column direction. Taking a case in which the N types of display areas include four display areas which are the first type display area A, the second type display area B, the third type display area C and the fourth type display area D as an example. In this embodiment, the first type display area A, the second type display area B, the third type display area C and the fourth type display area D in a display part may be driven according to the listed order. In an implementation of this embodiment, as shown in FIG. 17, in the column direction Y1, the fourth type display area D, the first type display area A, the third type display area C and the second type display area B included in the display part may be arranged according to the listed order. In another implementation of this embodiment, in the column direction Y1, the fourth type display area D, the third type display area C, the first type display area A and the second type display area B included in the display part may be arranged according to the listed order or other orders, which is not limited in the present disclosure and depends on actual situations.

Figure 18:
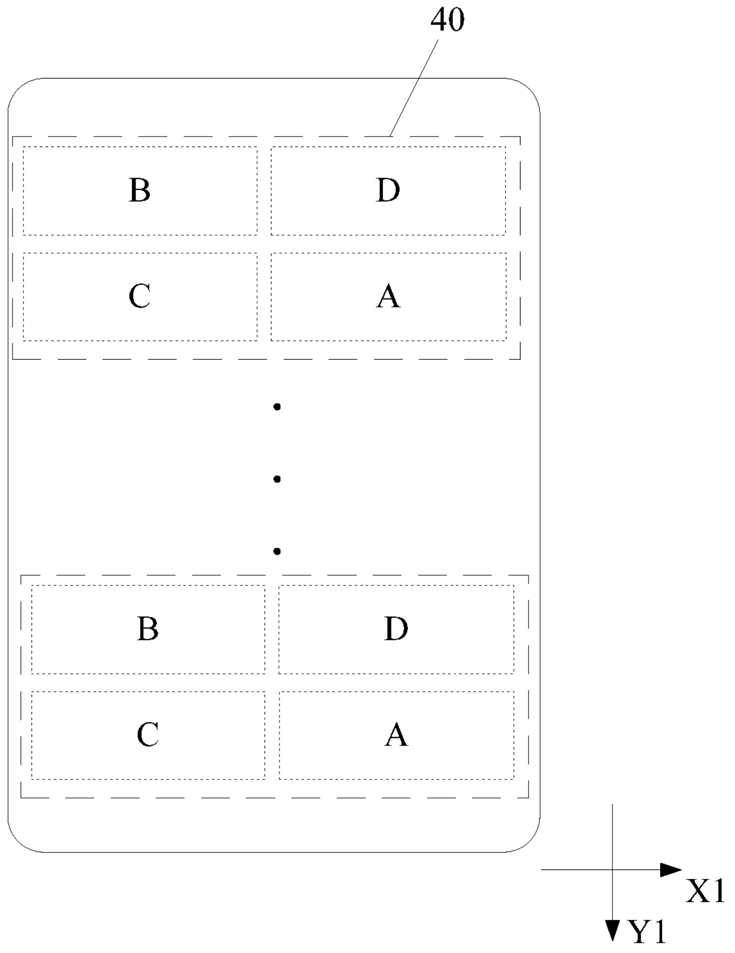
FIG. 18 is a schematic diagram of a display panel according to another embodiment of the present disclosure.
Figure 19:
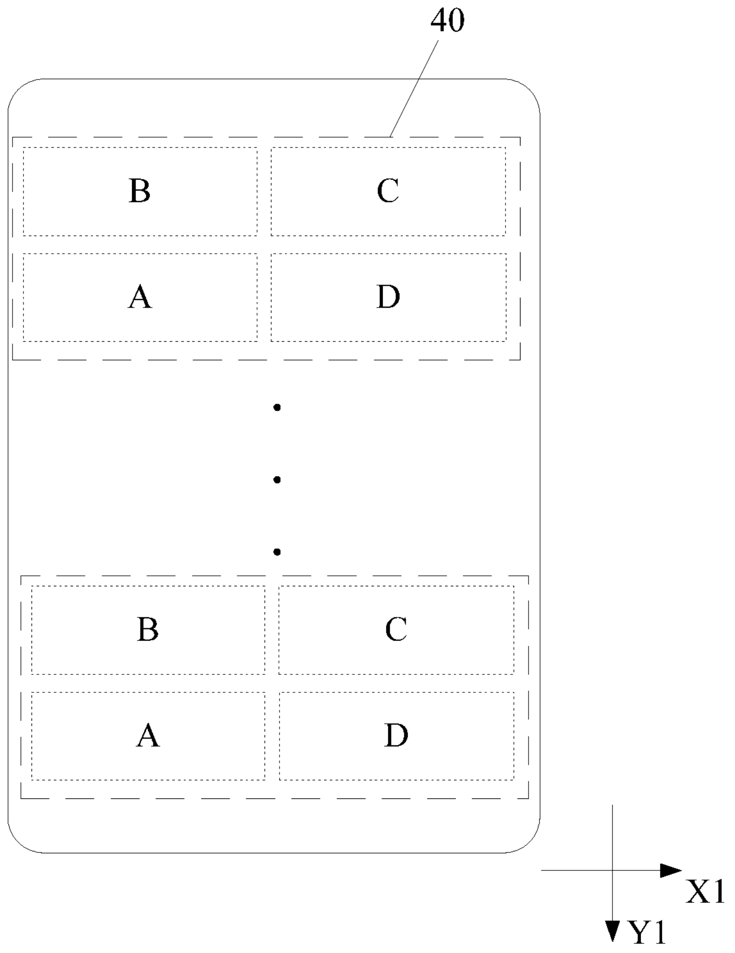
FIG. 19 is a schematic diagram of a display panel according to another embodiment of the present disclosure.

In another embodiment of the present disclosure, the preset direction includes a row direction and a column direction. Taking a case in which the N types of display areas include four types of display areas which are the first type display area A, the second type display area B, the third type display area C and the fourth type display area D as an example. In this embodiment, the first type display area A, the second type display area B, the third type display area C and the fourth type display area D in a display part are driven according to the listed order. In an implementation of this embodiment, as shown in FIG. 18, in the row direction X1, the display part includes the second type display area B and the fourth type display area D that are arranged sequentially, and the third type display area C and the first type display area A that are arranged sequentially. In the column direction Y1, the display part includes the second type display area B and the third type display area C that are arranged sequentially, and the fourth type display area D and the first type display area A that are arranged sequentially. In another implementation of this embodiment, as shown in FIG. 19, in the row direction X1, the display part includes the second type display area B and the third type display area C that are arranged sequentially, and the first type display area A and the fourth type display area D that are arranged sequentially. In the column direction Y1, the display part includes the second type display area B and the first type display area A that are arranged sequentially, and the third type display area C and the fourth type display area D that are arranged sequentially. In other implementations of this embodiment, the first type display area A, the second type display area B, the third type display area C and the fourth type display area D in a display part may be arranged according to other arrangement orders, which is not limited in the present disclosure and depends on actual situations.

Figure 20:
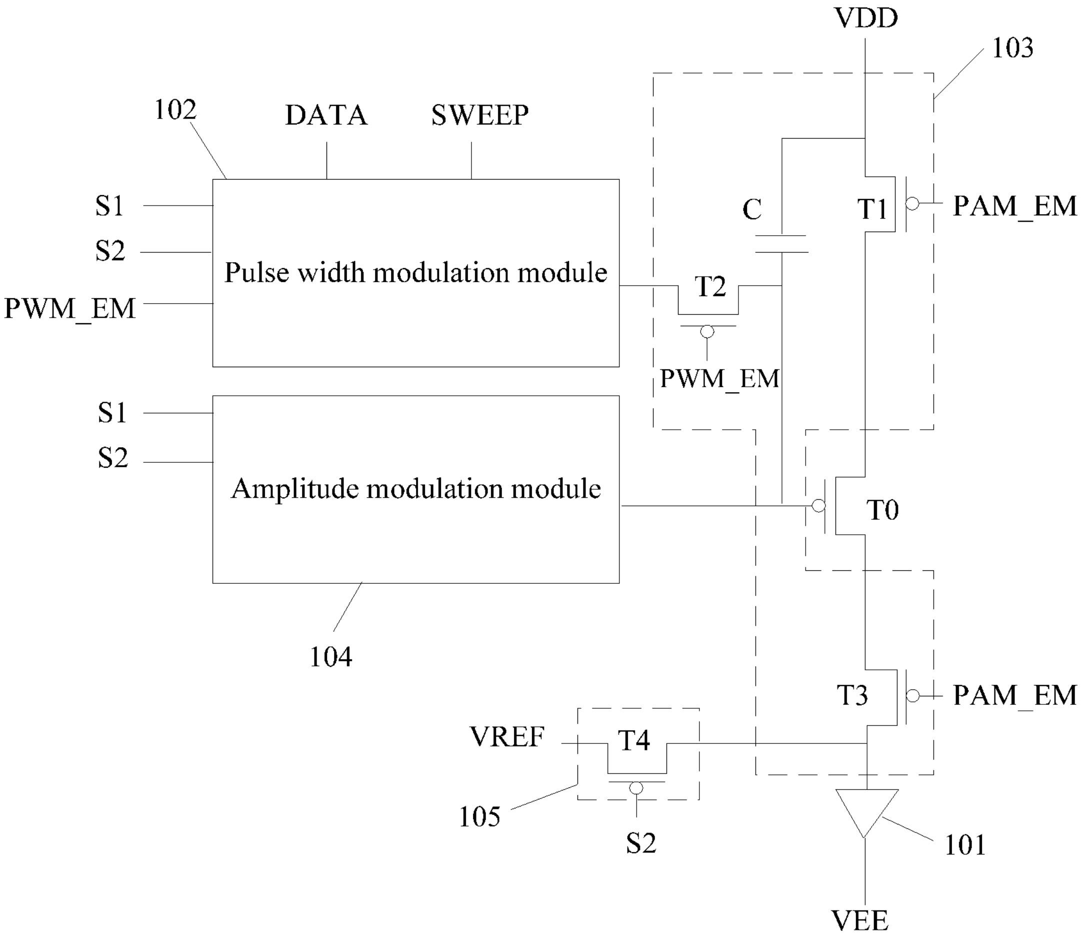
FIG. 20 is a schematic structural diagram of a pixel driving circuit in a display panel according to an embodiment of the present disclosure.

As shown in FIG. 20, in an embodiment of the present disclosure, the display panel further includes a pixel driving circuit in addition to the sub-pixels 101. As shown in FIG. 20, the pixel driving circuit includes a pulse width modulation (PWM) module 102, a light emitting control module 103 and a driving transistor T0. The pulse width modulation module 102 outputs a pulse width setting signal to a first end of the light emitting control module 103 based on a sweep signal SWEEP. The driving transistor T0 is configured to output a driving current based on a signal of a gate of the driving transistor T0 and the signal of the first end of the driving transistor T0. The light emitting control module 103 is configured to control the sub-pixels 101 to emit a light in response to the driving current under the control of the light emitting control signal, and output the pulse width setting signal to the gate of the driving transistor T0 to control the light emitting time of the driving transistor T0. It should be noted that in this embodiment, among the N types of display areas, the sub-pixels of the same type of display areas share the sweep signal and the light emitting control signal, and the sub-pixels of the same type of display areas emit lights at the same time, improving light emitting synchronization of the sub-pixels of the same type of display areas and reducing the number of control signals in the display panel.

In an embodiment of the present disclosure, as shown in FIG. 20, the pixel driving circuit further includes an amplitude modulation module 104 and a reset module 105. The amplitude modulation module 104 is configured to output an amplitude setting signal to the gate of the driving transistor T0. The reset module 105 is electrically connected with a first pole of the sub pixel 101 to reset the first pole of the sub pixel.

In an embodiment of the present disclosure, the light emitting control module 103 includes a first transistor T1, a second transistor T2 and a third transistor T3.

A first pole of the first transistor T1 is electrically connected with an input end of the power supply voltage to input a power supply voltage signal VDD. A second pole of the first transistor T1 is electrically connected with a first pole of the driving transistor T0. A gate of the first transistor T1 is electrically connected with the first light emitting control terminal, and the first light emitting control signal PAM_EM is inputted to the gate. Under the control of the first light emitting control signal PAM_EM, the power supply voltage signal is transmitted to the first pole of the driving transistor T0.

A first pole of the second transistor T2 is electrically connected with the pulse width modulation module 102 to input the pulse width setting signal. A second pole of the second transistor T2 is electrically connected with the gate of the driving transistor T0. The second light emitting control signal PWM_EM is inputted to the gate of the second transistor T2. Under the control of the second light emitting control signal PWM_EM, the pulse width setting signal is transmitted to the gate of the driving transistor T0.

A first pole of the second transistor T3 is electrically connected with the second pole of the driving transistor T0. A second pole of the second transistor T3 is electrically connected with the first pole of the sub pixel 101. The gate of the second transistor T3 is electrically connected with the first light emitting control terminal, and the first light emitting control signal PAM_EM is inputted to the gate. Under the control of the first light emitting control signal PAM_EM, the drive current outputted by the drive transistor T0 is transmitted to the sub pixel 101.

In an embodiment of the present disclosure, the reset module 105 includes a fourth transistor. A first pole of the fourth transistor is electrically connected with a reference signal terminal, and a reference signal VREF is inputted to the first pole. A second pole of the fourth transistor is electrically connected with the first pole of the sub pixel 101. A gate of the fourth transistor is electrically connected with a second scanning signal. Under the control of the second scanning signal, the reference signal VREF is transmitted to the first pole of the sub pixel 101 to reset the first pole of the sub pixel 101.

It should be noted that in the above embodiments, the transistors in the pixel driving circuit may all be P-type transistors or N-type transistors. In one embodiment, some of the transistors may be P-type transistors and some of the transistors may be N-type transistors, which is not limited in the present disclosure and depends on actual situations.

Figure 21:
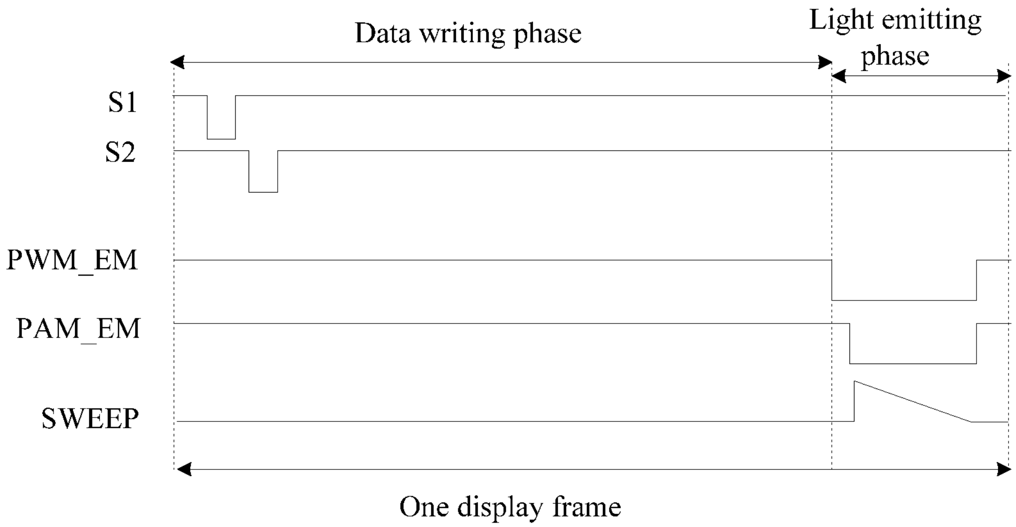
FIG. 21 is a timing diagram of a pixel driving circuit during operation of the pixel driving circuit in a display panel according to an embodiment of the present disclosure.

An operation process of the pixel driving circuit according to the embodiments of the present disclosure is described below by taking a case in which the transistors in the pixel driving circuit are all P-type transistors as an example. Reference is made to FIG. 21, which is a timing diagram of a pixel driving circuit shown in FIG. 20 during operation. In this embodiment, the operation process of the pixel driving circuit includes a data writing phase and a light emitting phase.

In the data writing stage, when the first scanning signal S1 is a low level and the second scanning signal S2 is a high level, the amplitude modulation module 104 resets the gate of the driving transistor T0, and the driving transistor T0 is switched on. When the first scanning signal S1 is switched to a high level and the second scanning signal S2 is switched to a low level, the amplitude modulation module 104 increases a gate voltage of the driving transistor T0 until a voltage across both ends of the capacitor C is equal to a voltage corresponding to the amplitude setting signal. The second scanning signal S2 is switched to a high level again, and a voltage of the gate of the driving transistor T0 is equal to a voltage corresponding to the amplitude setting signal.

In the light emitting phase, when the first scanning signal S1 and the second scanning signal S2 are high levels and the first light emitting control signal PAM_EM is a low level, the driving transistor T0, the driving transistor T1 and the driving transistor T2 are switched on to form a circuit path between VDD and VEE. When the second light emitting control signal PWM_EM is a low level, the driving transistor T2 is switched on to form a circuit path between the sweep signal SWEEP and the driving transistor. The driving transistor T0 outputs a driving current to the first pole of the sub pixel 101 based on the signal of the gate of the driving transistor T0 and the signal of the first end of the driving transistor T0. The sub pixel 101 emits a light in response to the driving current. When the sweep signal SWEEP decreases linearly, the driving transistor T0 is switched off and then the sub pixel is extinguished, and thus display of a display frame is ended.

In an embodiment, a time instant when the first light emitting control signal is switched to a low level is later than a time instant when the second light emitting control signal is switched to a low level, which is not limited in the present disclosure and depends on actual situations.

Figure 22:
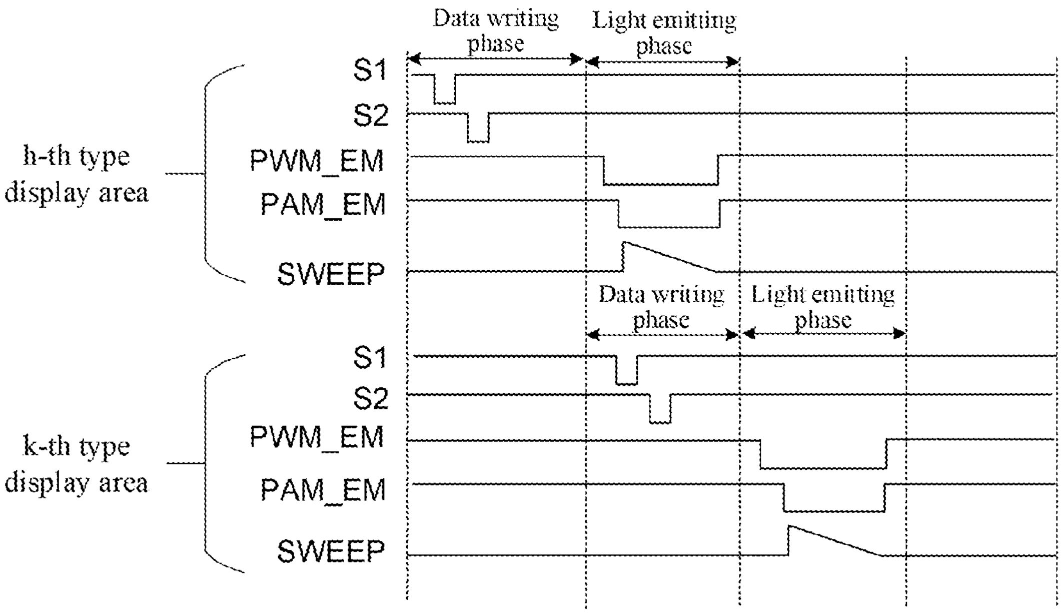
FIG. 22 is a timing diagram of sweep signals of an h-th type display area and a k-th type display area in a display panel according to an embodiment of the present disclosure.

In an embodiment of the present disclosure, the N types of display areas include an h-th type display area and a k-th type display area. Each of h and k is an integer greater than zero and less than or equal to N, and h is not equal to k. In this embodiment, as shown in FIG. 22, in a same display frame, a start time instant of the effective time period of the sweep signal SWEEP of the sub pixel in the h-th type display area is earlier than the start time of the effective time period of the sweep signal SWEEP of the sub pixel in the k-th type display area.

Figure 23:
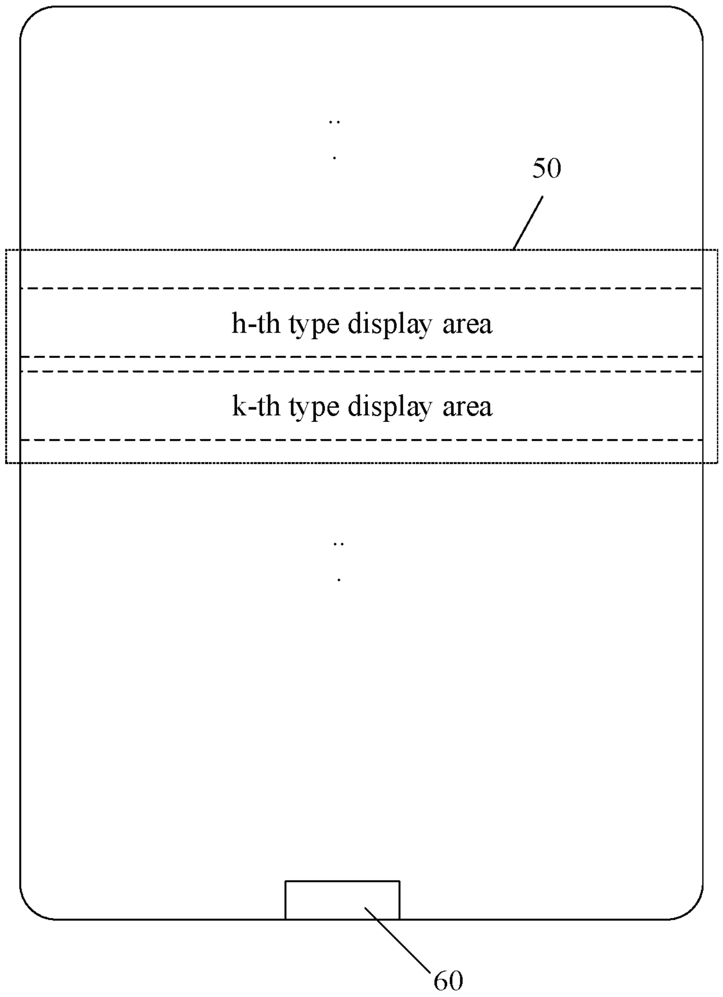
FIG. 23 is a schematic diagram of a display panel according to another embodiment of the present disclosure.

In an embodiment of the present disclosure, as shown in FIG. 23, each of the M display parts includes a fourth display part 50, and the fourth display part 50 includes at least one h-th type display area and at least one k-th type display area. The display panel includes a power supply voltage input terminal 60. In the fourth display part 50, the h-th type display area is arranged on a side of the k-th type display area away from the power supply voltage input terminal 60, and a display area away from the power supply voltage input terminal 60 among the same type of display areas emits a light first, and a display area close to the power supply voltage input terminal 60 among the same type of display areas emits a light later, which reduces the voltage drop on the power supply voltage line when the display area far away from the power supply voltage input terminal 60 among the same type of display areas emits a light, to improve uniformity of the display screen of the display panel.

Figure 24:
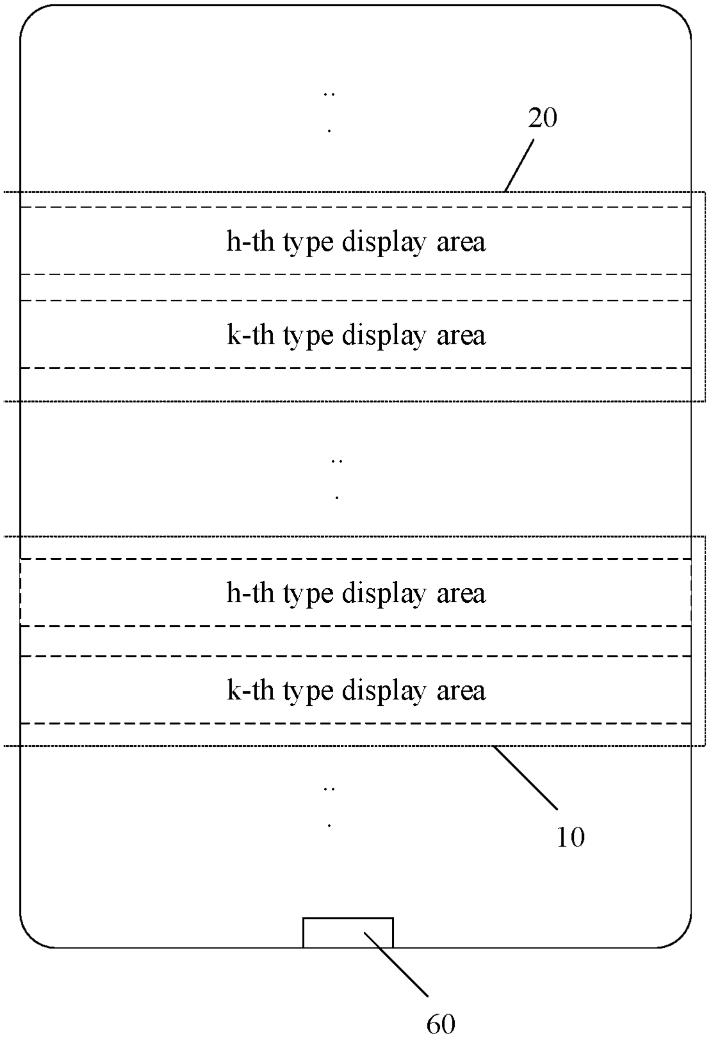
FIG. 24 is a schematic diagram of a display panel according to another embodiment of the present disclosure.

In another embodiment of the present disclosure, as shown in FIG. 24, the display panel includes the power supply voltage input terminal 60, and the first display part 10 is arranged on a side of the second display part 20 close to the power supply voltage input terminal 60. The N types of display areas include an h-th type display area and a k-th type display area. Each of h and k is an integer greater than zero and less than or equal to N, and h is not equal to k. In this embodiment, in a same display frame, as shown in FIG. 22, the start time instant of the effective time period of the sweep signal SWEEP of the sub pixel in the h-th type display area is earlier than the start time of the effective time period of the sweep signal SWEEP of the sub pixel in the k-th type display area.

In an embodiment of the present disclosure, as shown in FIG. 24, the first display part 10 includes at least one h-th type display area and at least one k-th type display area. In the first display part 10, a ratio of the number of sub-pixels included in the h-th type display area to the number of sub-pixels included in the k-th type display area is equal to n1. The second display part 20 includes at least one h-th type display area and at least one k-th type display area. In the second display part 20, a ratio of the number of sub-pixels included in the h-th type display area to the number of sub-pixels included in the k-th type display area is equal to n2 where n1 is less than n2, and in the display area emitting lights first, the number of sub-pixels arranged on an area away from the power supply voltage input terminal 60 is large and the number of sub-pixels arranged on an area close to the power supply voltage input terminal 60 is small, and in the display area emitting lights later, the number of sub-pixels arranged on an area away from the power supply voltage input terminal 60 is small and the number of sub-pixels arranged on an area close to the power supply voltage input terminal 60 is large, and to further reduce the voltage drop on the power supply voltage line when the sub-pixels far away from the power supply voltage input terminal 60 emit lights, to improve uniformity of the display screen of the display panel, which is not limited in the present disclosure and depends on actual situations.

Figure 25:
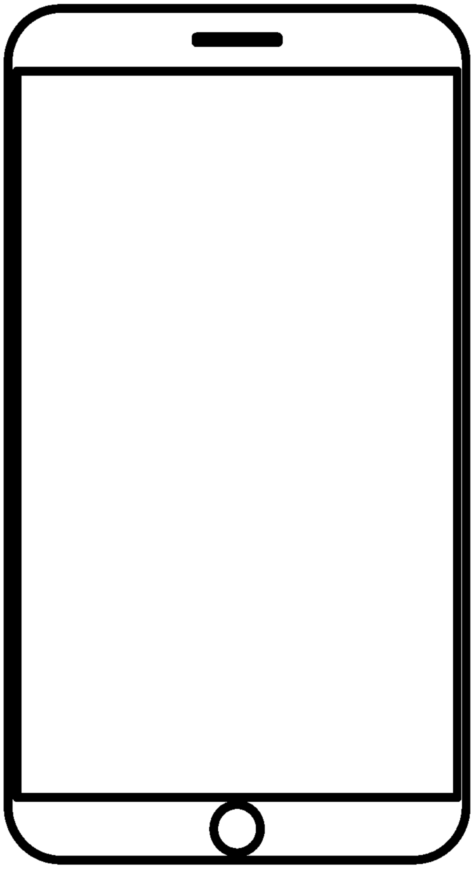
FIG. 25 is a schematic diagram of a display device according to an embodiment of the present disclosure.

A display device is further provided according to an embodiment of the present disclosure. As shown in FIG. 25, the display device includes the display panel according to any one of the above embodiments.

The display panel and the display device including the display panel according to the embodiments of the present disclosure include N types of display areas. The N types of display areas include an i-th type display area and a j-th type display area. Light-emitting time periods of the i-th type display area and the j-th type display area at least partially do not overlap, to reduce the number of sub-pixels driven by a power supply voltage line in the display panel at the same time period, and to reduce a rise amplitude of an instantaneous current on the power supply voltage line and reduce a voltage drop on the power supply voltage line when the sub-pixels emitting lights at the same time period emit lights with the same brightness, to improve the uniformity of the display screen.

A method for driving a display panel is further provided according to an embodiment of the present disclosure. The method is used for driving the display panel according to any one of the above embodiments. In this embodiment, the method includes: in a first time period, controlling sub-pixels included in the i-th type display area to emit lights; and in a second time period, controlling sub-pixels included in the j-th type display area to emit lights. The first time period and the second time period at least partially do not overlap, to reduce the number of sub-pixels driven by a power supply voltage line in the display panel at the same time period, and to reduce a rise amplitude of an instantaneous current on the power supply voltage line and reduce a voltage drop on the power supply voltage line when the sub-pixels emitting lights at the same time period emit lights with the same brightness, to improve the uniformity of the display screen.

In an embodiment of the present disclosure, the first time period and the second time period do not overlap, and the first time period and the second time period are two different light-emitting time periods. In this embodiment, the in a first time period, controlling sub-pixels included in the i-th type display area to emit lights, and in a second time period, controlling sub-pixels included in the j-th type display area to emit lights includes:

in the first time period, controlling the sub-pixels included in the i-th type display area to emit lights simultaneously and writing a data signal to the sub-pixels included in the j-th type display area; and in the second time period, controlling the sub-pixels included in the j-th type display area to emit lights simultaneously.

Figure 26:
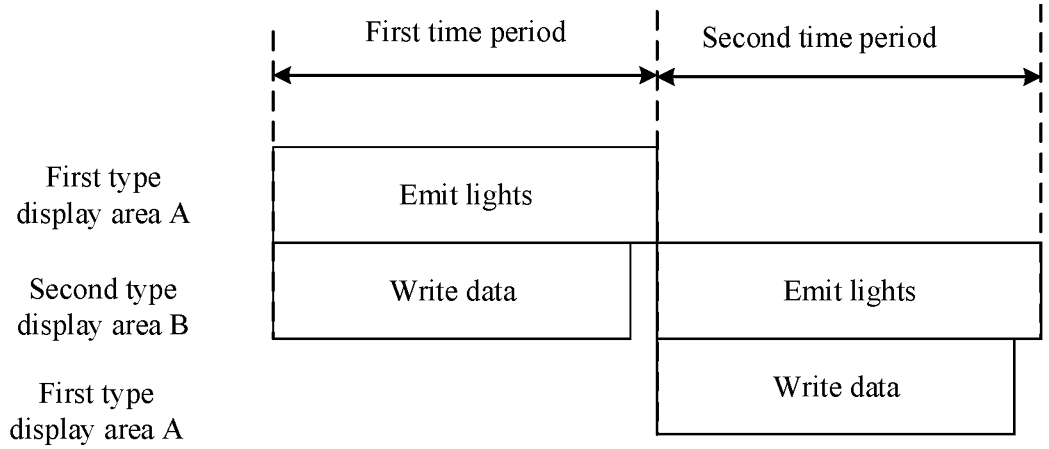
FIG. 26 is a schematic diagram of a method for driving a display panel according to an embodiment of the present disclosure.

In an embodiment of the present disclosure, taking a case in which N is equal to two and the N types of display areas include a first type display area A and a second type display area B as an example, as shown in FIG. 26, the method for driving a display panel includes:

in the first time period, controlling sub-pixels included in the first type display area A to emit lights simultaneously and writing a data signal to sub-pixels included in the second type display area B;

in the second time period, controlling sub-pixels included in the second type display area B to emit lights simultaneously and writing a data signal to sub-pixels included in the first type display area A; and repeating operations performed in the first time period and the second time period in a circular manner to display various display frames.

In an embodiment of the present disclosure, the first time period and the second time period are two adjacent light-emitting time periods, which is not limited in the present disclosure and depends on actual situations.

The method for driving a display panel according to the embodiment of the present disclosure is described below by taking a case in which the first time period and the second time period are two adjacent light-emitting time periods as an example.

Figure 27:
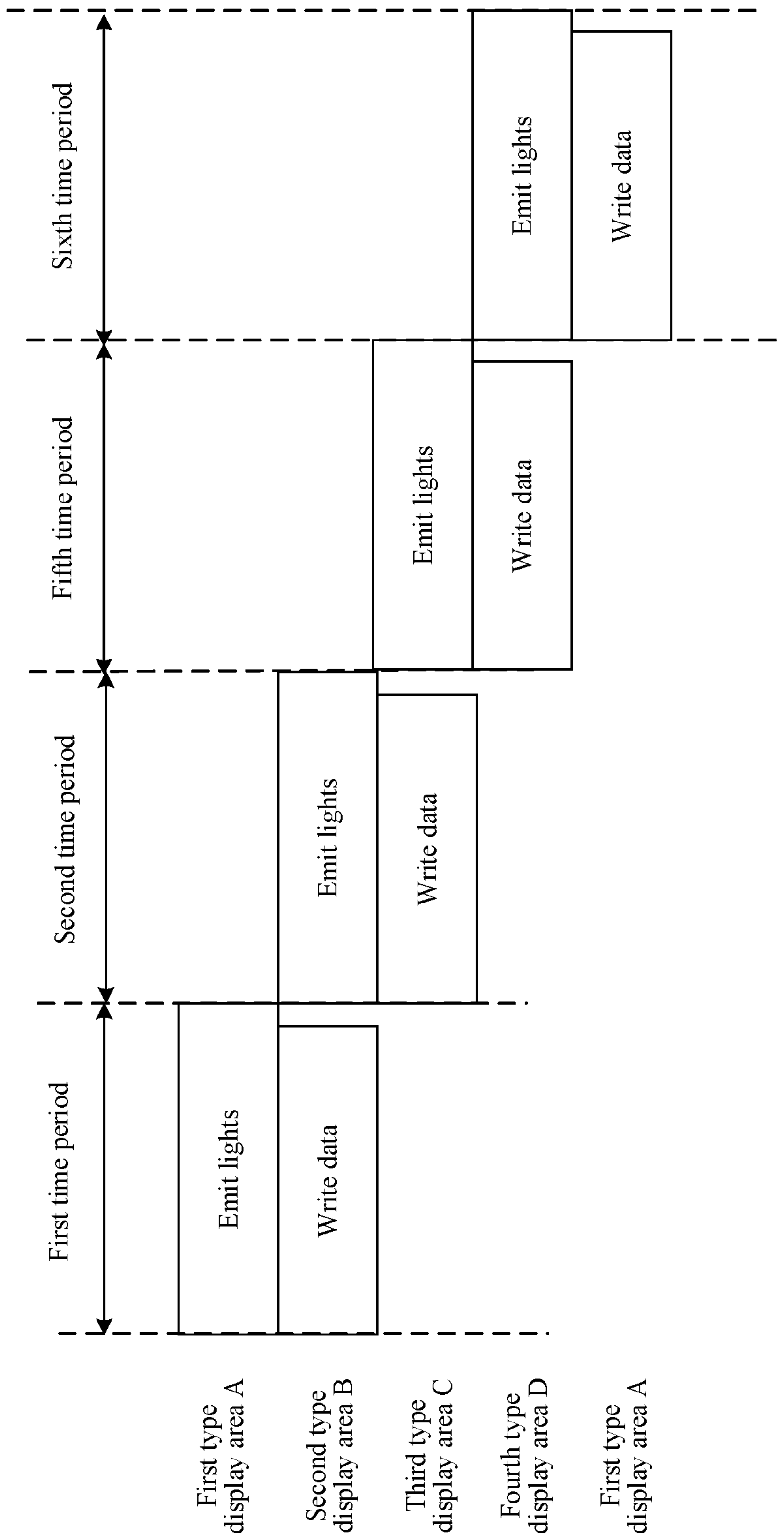
FIG. 27 is a schematic diagram of a method for driving a display panel according to another embodiment of the present disclosure.

In another embodiment of the present disclosure, by taking a case in which N is equal to 4 and the N types of display areas include a first type display area A, a second type display area B, a third type display area C and a fourth type display area D as an example, as shown in FIG. 27, the method for driving a display panel includes:

in a first time period, controlling sub-pixels included in the first type display area A to emit lights simultaneously and writing a data signal to sub-pixels included in the second type display area B;

in a second time period, controlling sub-pixels included in the second type display area B to emit lights simultaneously and writing a data signal to sub-pixels included in the third type display area C;

in a fifth time period, controlling sub-pixels included in the third type display area C to emit lights simultaneously and writing a data signal to sub-pixels included in the fourth type display area D;

in a sixth time period, controlling sub-pixels included in the fourth type display area D to emit lights simultaneously and writing a data signal to sub-pixels included in the first type display area A, and repeating operations performed in the above time periods in a circular manner to display various display frames.

In an embodiment of the present disclosure, the time period for writing a data signal to the sub-pixels included in the j-th type display area is less than the first time period, to avoid that the data writing of the sub-pixels included in the j-th type display area is not completed when the sub-pixels included in i-th type display area end emitting lights, which results in a long delay of the start time of the light-emitting time period of the sub-pixels included in the j-th type display area, to affect the display quality of the display screen. As shown in FIG. 26 and FIG. 27, the time period for writing a data signal to the sub-pixels included in the second type display area B is less than the light-emitting time period of the first type display area A. The time period for writing a data signal to the sub-pixels included in the third type display area C is less than the light-emitting time period of the second type display area B. The time period for writing a data signal to the sub-pixels included in the fourth type display area D is less than the light-emitting time period of the third type display area C. The time period for writing a data signal to the sub-pixels included in the first type display area A is less than the light-emitting time period of the fourth type display area D.

In another embodiment of the present disclosure, the in a first time period, controlling sub-pixels included in the i-th type display area to emit lights, and in a second time period, controlling sub-pixels included in the j-th type display area to emit lights includes:

in a third time period, writing a data signal to the sub-pixels included in the first display part;

in the first time period, controlling the sub-pixels of the i-th type display area of the display panel to emit lights;

in a fourth time period, writing a data signal to the sub-pixels included in the second display part; and in the second time period, controlling the sub-pixels of the j-th type display area of the display panel to emit lights.

A chronological order of start times of the above time periods is as following: the third time period, the first time period, the fourth time period and the second time period. That is, the start time of the first time period is later than the start time of the third time period, the start time of the fourth time period is later than the start time of the first time period, and the start time of the second time period is later than the start time of the fourth time period.

Figure 28:
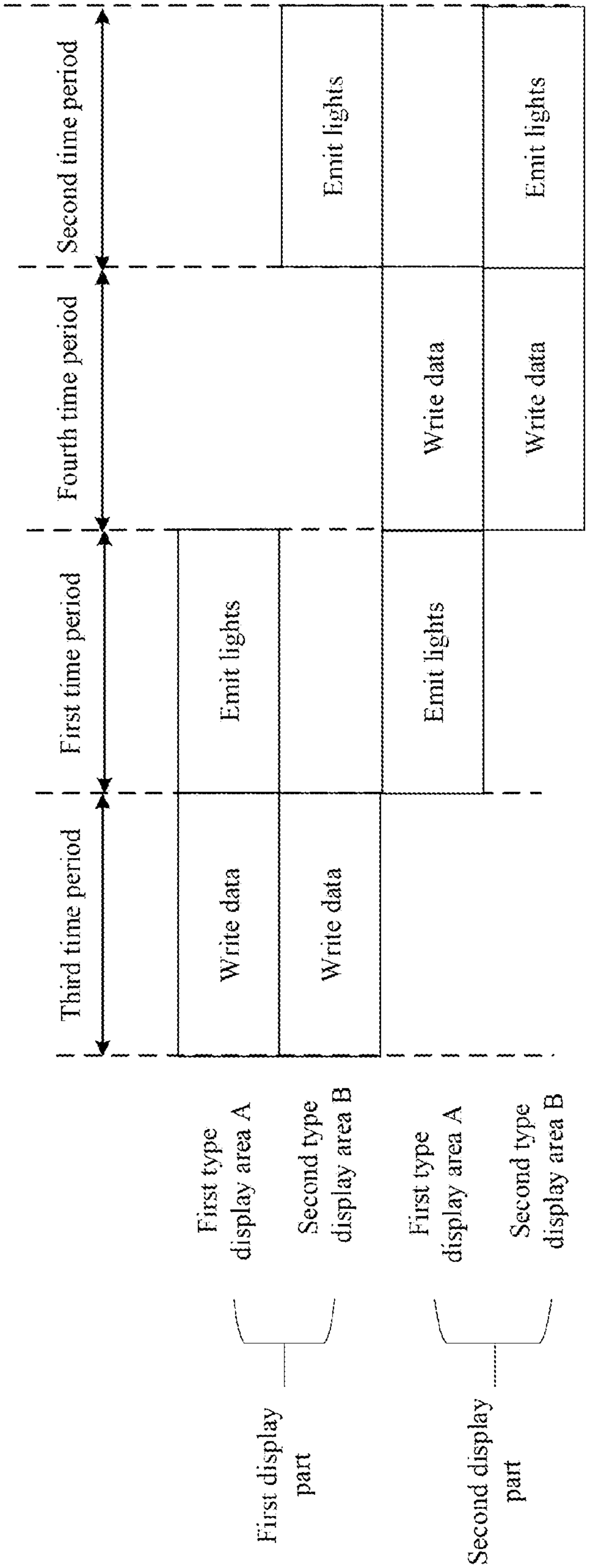
FIG. 28 is a schematic diagram of a method for driving a display panel according to another embodiment of the present disclosure.

In an embodiment of the present disclosure, M is equal to two and N is equal to two. The N types of display areas include two types of display areas, which are a first type display area A and a second type display area B. The first display part includes one first type display area A and one second type display area B. The second display part includes one first type display area A and one second type display area B. As shown in FIG. 28, the method for driving a display panel includes:

in a third time period, writing a data signal to sub-pixels in the first type display area A and the second type display area B included in the first display part;

in the first time period, controlling sub-pixels of all first type display areas A in the first display part and the second display part of the display panel to emit lights;

in a fourth time period, writing a data signal to sub-pixels in the first type display area A and the second type display area B included in the second display part; and in the second time period, controlling sub-pixels of all second type display areas B in the first display part and the second display part of the display panel to emit lights, and to display a display frame.

Figure 29:
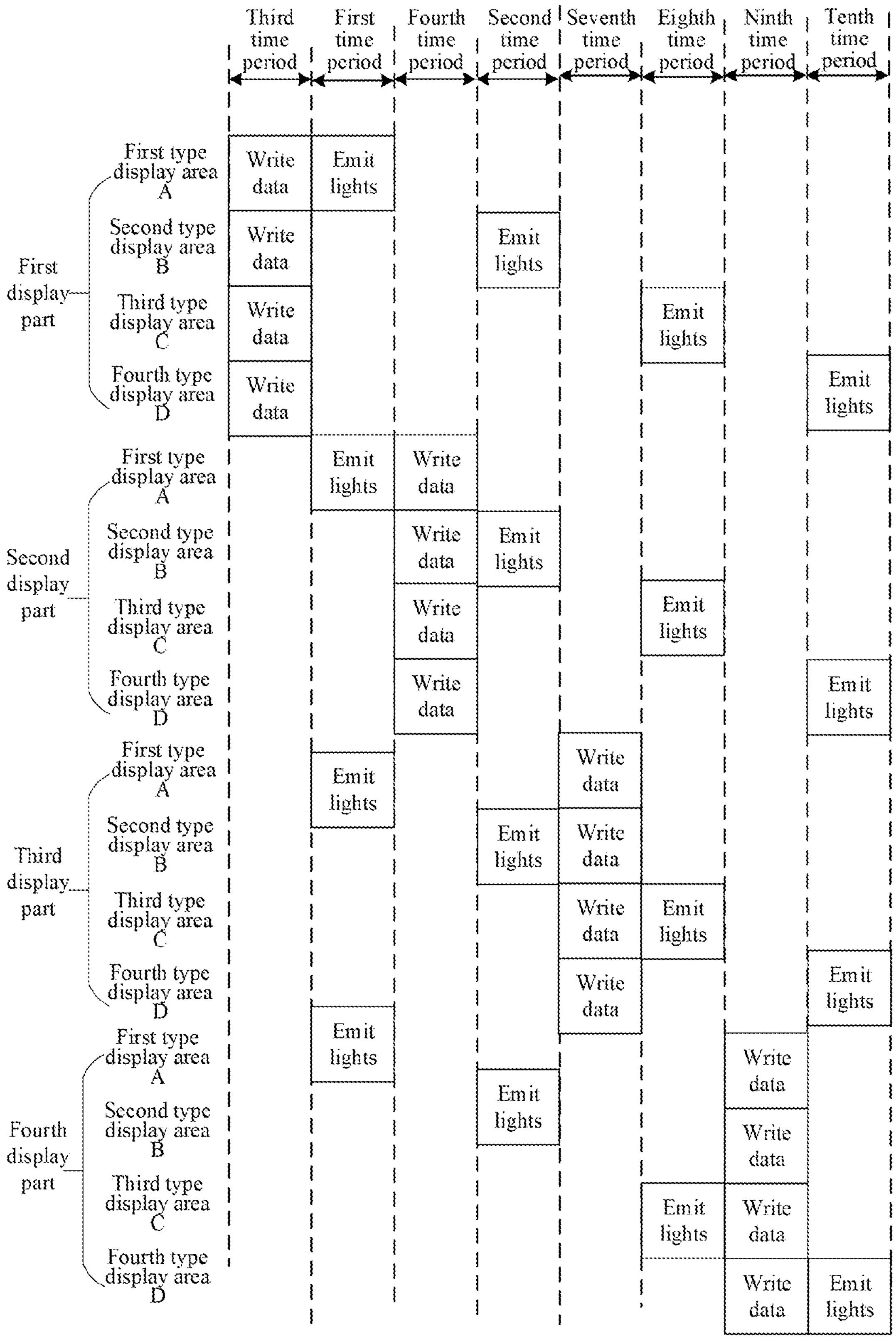
FIG. 29 is a schematic diagram of a method for driving a display panel according to another embodiment of the present disclosure.

In another embodiment of the present disclosure, M is equal to 4 and N is equal to 4. The M display parts include four display parts, which are a first display part, a second display part, a third display part and a fourth display part. The N types of display areas include four types of display areas, which are a first type display area A, a second type display area B, a third type display area C and a fourth type display area D. Each display part includes one first type display area A, one second type display area B, one third type display area C and one fourth type display area D. As shown in FIG. 29, the method for driving a display panel includes:

in a third time period, writing a data signal to sub-pixels in the first type display area A, the second type display area B, the third type display area C and the fourth type display area D included in the first display part;

in the first time period, controlling sub-pixels of all first type display areas A in the first display part, the second display part, the third display part and the fourth display part of the display panel to emit lights;

in a fourth time period, writing a data signal to sub-pixels in the first type display area A, the second type display area B, the third type display area C and the fourth type display area D included in the second display part;

in the second time period, controlling sub-pixels of all second type display areas B in the first display part, the second display part, the third display part and the fourth display part of the display panel to emit lights;

in a seventh time period, writing a data signal to sub-pixels in the first type display area A, the second type display area B, the third type display area C and the fourth type display area D included in the third display part;

in an eighth time period, controlling sub-pixels of all third type display areas C in the first display part, the second display part, the third display part and the fourth display part of the display panel to emit lights;

in a ninth time period, writing a data signal to sub-pixels in the first type display area A, the second type display area B, the third type display area C and the fourth type display area D included in the fourth display part; and in a tenth time period, controlling sub-pixels of all fourth type display areas D in the first display part, the second display part, the third display part and the fourth display part of the display panel to emit lights, and to display a display frame.

It should be noted that in the above embodiments, in the first time period, the data signal of the sub-pixels included in the first display part is a data signal of a display screen of a current frame, and the data signal of the sub-pixels included in the second display part is a data signal of a display screen of a previous frame. In the second time period, the data signal of the sub-pixels included in the first display part is the data signal of the display screen of the current frame, and the data signal of the sub-pixels included in the second display part is the data signal of the display screen of the current frame.

It should also be noted that data signals written to sub-pixels of different pixel rows are not necessarily the same. Therefore, in an embodiment of the present disclosure, the in the third time period, writing a data signal to sub-pixels included in the first display part includes: in the third time period, successively writing data signals to the sub-pixels in sub pixel rows included in the first display part. Similarly, the in the fourth time period, the writing a data signal to sub-pixels included in the second display part includes: successively writing data signals to the sub-pixels included in sub pixel rows of the second display part.

In this embodiment, data signals are successively written to the sub-pixels included in different types of display areas in a same display part, that is, an order in which data signals are written to sub pixel rows in the display panel is the same as an order in which the sub pixel rows are arranged in the display panel, regardless of the type of the display area, and, a process of writing data signals to pixel rows in the display panel is compatible with a process of writing data signals to existing pixel rows, to reduce a cost of driving the display panel.

In summary, the method for driving a display panel according to this embodiment of the present disclosure includes: in the first time period, controlling the sub-pixels included in the i-th type display area to emit lights, and in the second time period, controlling the sub-pixels included in the j-th type display area to emit lights. The first time period and the second time period at least partially do not overlap, to reduce the number of sub-pixels driven by a power supply voltage line in the display panel at the same time period, and to reduce a rise amplitude of an instantaneous current on the power supply voltage line and reduce a voltage drop on the power supply voltage line when the sub-pixels emitting lights at the same time period emit lights with the same brightness, to improve the uniformity of the display screen.

Parts in this specification are described in a manner of combination of juxtaposition and progression. Each part focuses on the differences from other parts. The same and similar parts may be referred to each other.

The invention claimed is:

1. A display panel, comprising:

a pixel driving circuit and sub-pixels, wherein the pixel driving circuit comprises a pulse width modulation circuit, the pulse width modulation circuit is configured to receive at least a sweep signal, provide a pulse width setting signal and control a light emitting time of at least one of the sub-pixels;

the display panel comprises N types of display areas, and the N types of display areas comprise an h-th type display area and a k-th type display area, wherein N is an integer greater than or equal to two, each of h and k is an integer greater than zero and less than or equal to N;

during a refresh cycle of the display panel, a start time of an effective time period of a sweep signal received by a pixel driving circuit in the h-th type display area is earlier than a start time of an effective time period of a sweep signal received by a pixel driving circuit in the k-th type display area; and the display panel comprises a first display part and a second display part, and both the first display part and the second display part comprises at least one h-th type display area and at least one k-th type display area.

2. The display panel according to claim 1, wherein pixel driving circuits in at least one of the N types of display areas share a same sweep signal.

3. The display panel according to claim 1, wherein pixel driving circuits in the h-th type display area share a same sweep signal; and/or pixel driving circuits in the k-th type display area share a same sweep signal.

4. The display panel according to claim 1, wherein an effective period of a sweep signal received by a pixel driving circuit in the h-th type display area and an effective period of a sweep signal received by a pixel driving circuit in the k-th type display area do not overlap; and/or after the effective period of the sweep signal received by the pixel driving circuit in the h-th type display area, the effective period of the sweep signal received by the pixel driving circuit in the k-th type display area starts.

5. The display panel according to claim 1, wherein an operation process of the pixel driving circuit comprises a data writing stage, and the pixel driving circuit receives a data signal in the data writing stage;

wherein an effective period of a sweep signal received by a pixel driving circuit in the h-th type display area and a data writing stage of a pixel driving circuit in the k-th type display area at least partially overlap.

6. The display panel according to claim 5, wherein the pixel driving circuit comprises an amplitude modulation circuit, wherein in the data writing stage, the pulse width modulation circuit receives a pulse width data signal PWM_DATA; and/or in the data writing stage, the amplitude modulation circuit receives an amplitude data signal PAM_DATA.

7. The display panel according to claim 1, wherein during a refresh cycle of the display panel, a start time of a light-emitting stage of the sub pixels in the h-th type display area is earlier than a start time of a light-emitting stage of the sub pixel in the k-th type display area.

8. The display panel according to claim 7, wherein the light-emitting stage of the sub pixels in the h-th type display area and the light-emitting stage of the sub pixels in the k-th type display area do not overlap.

9. The display panel according to claim 1, wherein the display panel comprises a power supply voltage input terminal and a power supply voltage line, the power supply voltage input terminal is configured to provide a signal for the power supply voltage line, and the h-th type display area is located on a side of the k-th type display area away from the power supply voltage input terminal.

10. The display panel according to claim 1, wherein the display panel comprises a power supply voltage input terminal and a power supply voltage line, the power supply voltage input terminal is configured to provide a signal for the power supply voltage line, and the first display part is located on a side of the second display part close to the power supply voltage input terminal.

11. The display panel according to claim 10, wherein in at least one of the first display part and the second display part, the h-th type display area is located on a side of the k-th type display area away from the power supply voltage input terminal.

12. The display panel according to claim 11, wherein in the first display part, a ratio of the number of the sub-pixels comprised in the h-th type display area to the number of the sub-pixels comprised in the k-th type display area is equal to n1; and in the second display part, a ratio of the number of the sub-pixels comprised in the h-th type display area to the number of the sub-pixels comprised in the k-th type display area is equal to n2, wherein n1 is less than n2.

13. The display panel according to claim 11, wherein the number of the sub-pixels comprised in the h-th type display area in the first display part is greater than the number of the sub-pixels comprised in the h-th type display area in the second display part; and/or the number of the sub-pixels comprised in the k-th type display area in the second display part is greater than the number of the sub-pixels comprised in the k-th type display area in the first display part.

14. The display panel according to claim 1, wherein an arrangement order of the h-th type display area and the k-th type display area in the first display part is the same as an arrangement order of the h-th type display area and the k-th type display area in the second display part.

15. The display panel according to claim 1, wherein the pixel driving circuit further comprises an amplitude modulation circuit, the pulse width modulation circuit is configured to output the pulse width setting signal, and the amplitude modulation circuit is configured to output an amplitude setting signal.

16. The display panel according to claim 1, wherein the pixel driving circuit comprises a light emitting control circuit and a driving transistor;

the light emitting control module-circuit comprises a first transistor, a second transistor and a third transistor, wherein a first terminal of the first transistor is configured to receive a power supply voltage signal, a second terminal of the first transistor is electrically connected with a first terminal of the driving transistor, and a gate of the first transistor is configured to receive a first light emitting control signal;

a first terminal of the second transistor is electrically connected with the pulse width modulation circuit to receive the pulse width setting signal, a second terminal of the second transistor is electrically connected with a gate of the driving transistor, and a gate of the second transistor is configured to receive a second light emitting control signal; and a first terminal of the third transistor is electrically connected with a second terminal of the driving transistor, a second terminal of the third transistor is electrically connected with a first terminal of the sub pixels, and a gate of the third transistor is configured to receive the first light emitting control signal.

17. The display panel according to claim 1, wherein the pixel driving circuit further comprises a reset circuit, and the reset circuit is configured to reset at least one of the sub pixels;

wherein the rest circuit comprises a fourth transistor, a first terminal of the fourth transistor is electrically connected with a reference signal terminal to receive a reference signal, a second terminal of the fourth transistor is electrically connected with a first terminal of at least one of the sub pixels, and a gate of the fourth transistor is configured to receive a scanning signal.

18. A display device, comprising:

a display panel, the display panel comprises a pixel driving circuit and sub-pixels;

the pixel driving circuit comprises a pulse width modulation circuit, the pulse width modulation circuit is configured to receive at least a sweep signal, provide a pulse width setting signal and control a light emitting time of at least one of the sub-pixels;

the display panel comprises N types of display areas, and the N types of display areas comprise an h-th type display area and a k-th type display area, wherein N is an integer greater than or equal to two, each of h and k is an integer greater than zero and less than or equal to N; and during a refresh cycle of the display panel, a start time of an effective time period of a sweep signal received by a pixel driving circuit in the h-th type display area is earlier than a start time of an effective time period of a sweep signal received by a pixel driving circuit in the k-th type display area;

wherein the display panel comprises a first display part and a second display part, and both the first display part and the second display part comprises at least one h-th type display area and at least one k-th type display area.

19. A display panel, comprising:

a pixel driving circuit and sub-pixels, wherein the pixel driving circuit comprises a pulse width modulation circuit, the pulse width modulation circuit is configured to receive at least a sweep signal, provide a pulse width setting signal and control a light emitting time of at least one of the sub-pixels;

the display panel comprises N types of display areas, and the N types of display areas comprise an h-th type display area and a k-th type display area, wherein Nis an integer greater than or equal to two, each of h and k is an integer greater than zero and less than or equal to N; and during a refresh cycle of the display panel, a start time of an effective time period of a sweep signal received by a pixel driving circuit in the h-th type display area is earlier than a start time of an effective time period of a sweep signal received by a pixel driving circuit in the k-th type display area;

the display panel comprises a first display part and a second display part, and both the first display part and the second display part comprises at least one h-th type display area and at least one k-th type display area; and in the first display part, a ratio of the number of the sub-pixels comprised in the h-th type display area to the number of the sub-pixels comprised in the k-th type display area is equal to n1, and in the second display part, a ratio of the number of the sub-pixels comprised in the h-th type display area to the number of the sub-pixels comprised in the k-th type display area is equal to n2, wherein n1 is less than n2.

20. A display device, comprising the display panel according to claim 19.

* * * * *